US012203624B2

(12) United States Patent
Sato et al.

(10) Patent No.: US 12,203,624 B2
(45) Date of Patent: Jan. 21, 2025

(54) VEHICLE LAMP HAVING EXCITATION LIGHT SOURCE, LIGHT CONVERSION UNIT, AND OPTICAL FILTER

(71) Applicant: Ichikoh Industries, Ltd., Isehara (JP)

(72) Inventors: Yoshiro Sato, Isehara (JP); Naotoshi Sakakibara, Isehara (JP)

(73) Assignee: Ichikoh Industries, Ltd., Isehara (JP)

( * ) Notice: Subject to any disclaimer, the term of this patent is extended or adjusted under 35 U.S.C. 154(b) by 0 days.

(21) Appl. No.: 18/253,177

(22) PCT Filed: Nov. 16, 2021

(86) PCT No.: PCT/JP2021/042089
§ 371 (c)(1),
(2) Date: May 16, 2023

(87) PCT Pub. No.: WO2022/102786
PCT Pub. Date: May 19, 2022

(65) Prior Publication Data

US 2024/0003513 A1 Jan. 4, 2024

(30) Foreign Application Priority Data

Nov. 16, 2020 (JP) ................................ 2020-190355
Oct. 29, 2021 (JP) ................................ 2021-178246

(51) Int. Cl.
*F21S 43/16* (2018.01)
*F21S 43/20* (2018.01)
(Continued)

(52) U.S. Cl.
CPC ............ *F21S 43/16* (2018.01); *F21S 43/251* (2018.01); *F21S 43/26* (2018.01); *F21S 43/31* (2018.01);
(Continued)

(58) Field of Classification Search
CPC .. F21S 43/16; F21S 43/26; F21V 7/26; F21V 7/30; F21V 9/30; B60Q 1/44; B60Q 1/30; F21W 2103/35
See application file for complete search history.

(56) References Cited

U.S. PATENT DOCUMENTS 2,459,693 A * 1/1949 Gordon ................ F21S 43/255 250/483.1
7,543,959 B2 * 6/2009 Bierhuizen ............ H04N 9/315 362/293
(Continued)

FOREIGN PATENT DOCUMENTS

EP 2 857 741 A2 4/2015
EP 3 355 664 A1 8/2018
(Continued)

OTHER PUBLICATIONS

International Search Report mailed on Dec. 28, 2021 in PCT/JP2021/042089 filed on Nov. 16, 2021.
(Continued)

*Primary Examiner* — Ismael Negron
(74) *Attorney, Agent, or Firm* — Oblon, McClelland, Maier & Neustadt, L.L.P.

(57) ABSTRACT

A vehicle lamp includes: a lamp housing; a lamp lens forming a lamp chamber with the housing; an excitation-light irradiation unit for emitting excitation light; a light conversion unit for receiving the excitation light and emitting secondary light towards the lamp lens; and an optical filter for transmitting the excitation light and absorbing the secondary light. The excitation-light irradiation unit, the light conversion unit, and the optical filter are disposed in the lamp chamber. The optical filter is arranged between the excitation-light irradiation unit and the light conversion unit.

14 Claims, 17 Drawing Sheets

(51) Int. Cl.

| | |
|---|---|
| ***F21S 43/251*** | (2018.01) |
| ***F21S 43/31*** | (2018.01) |
| ***F21S 43/50*** | (2018.01) |
| ***F21S 45/70*** | (2018.01) |
| ***F21V 7/30*** | (2018.01) |
| ***F21V 9/20*** | (2018.01) |
| *F21W 103/20* | (2018.01) |
| *F21W 103/35* | (2018.01) |
| *F21Y 115/10* | (2016.01) |
| *F21Y 115/30* | (2016.01) |

(52) U.S. Cl.

CPC ............... *F21S 43/50* (2018.01); *F21S 45/70* (2018.01); *F21V 7/30* (2018.02); *F21V 9/20* (2018.02); *F21W 2103/20* (2018.01); *F21W 2103/35* (2018.01); *F21Y 2115/10* (2016.08); *F21Y 2115/30* (2016.08)

(56) References Cited

U.S. PATENT DOCUMENTS

| | | | | |
|---|---|---|---|---|
| 9,500,343 | B2 * | 11/2016 | Takahashi | F21V 5/004 |
| 10,132,460 | B1 * | 11/2018 | Salter | F21S 43/16 |
| 10,203,079 | B2 * | 2/2019 | Hadrath | F21S 41/24 |
| 10,738,950 | B2 * | 8/2020 | Khrushchev | F21S 41/176 |
| 11,215,335 | B2 * | 1/2022 | Sato | F21S 43/247 |
| 2011/0063115 | A1 | 3/2011 | Kishimoto | |
| 2012/0236536 | A1 * | 9/2012 | Harada | F21S 41/16 362/84 |
| 2014/0340918 | A1 * | 11/2014 | Suckling | F21V 9/30 362/510 |
| 2015/0159820 | A1 * | 6/2015 | Lee | F21K 9/64 362/84 |
| 2016/0003440 | A1 * | 1/2016 | Wataya | C09K 11/675 313/503 |
| 2017/0016586 | A1 | 1/2017 | Tsuda et al. | |
| 2020/0263846 | A1 * | 8/2020 | Miu | F21S 41/25 |
| 2023/0029917 | A1 * | 2/2023 | Sato | B60Q 1/28 |

FOREIGN PATENT DOCUMENTS

| | | | |
|---|---|---|---|
| JP | 3-101002 | A | 4/1991 |
| JP | 5-225802 | A | 9/1993 |
| JP | 2003-31008 | A | 1/2003 |
| JP | 2011-066069 | A | 3/2011 |
| JP | 2011-86432 | A | 4/2011 |
| JP | 2013-168585 | A | 8/2013 |
| JP | 2015-088220 | A | 5/2015 |
| JP | 2018-41589 | A | 3/2018 |
| WO | 2015/170696 | A1 | 11/2015 |
| WO | WO 2019/122612 | A1 | 6/2019 |
| WO | WO 2019/245030 | A1 | 12/2019 |

OTHER PUBLICATIONS

Extended European Search Report issued on May 8, 2024 in European Patent Application No. 21892031.2.

Japanese Office Action issued in Japanese Patent Application No. 2021-178246 on Oct. 23, 2024, (w/ English Translation).

* cited by examiner (A)

(B)

VEHICLE LAMP HAVING EXCITATION LIGHT SOURCE, LIGHT CONVERSION UNIT, AND OPTICAL FILTER

TECHNICAL FIELD

The present invention relates to a vehicle lamp.

BACKGROUND ART

As a vehicle lamp that uses secondary light (luminescence, photoluminescence) emitted by excitation light emitted from an excitation light source, there is one as shown in Patent Literature 1, for example.

The vehicle lamp in Patent Literature 1 has an excitation light source that emits excitation light, a light emitting layer from which the secondary light (red light) is emitted by the excitation light (blue light) emitted from the excitation light source, a holding member that holds the light emitting layer, and a lamp lens (lens member) from which the secondary light is emitted to an outside.

With the vehicle lamp in Patent Literature 1, surface light emission is acquired by the secondary light emitted from the light emitting layer. Moreover, since the vehicle lamp in Patent Literature 1 uses the light emitting layer that does not require electrical energy as a surface light-emission source, reliability of the surface light-emission source is improved as compared with organic light emitting diodes, which require electrical energy as a surface light-emission source.

CITATION LIST

Patent Literature

PTL 1: International Publication 2019/245030

SUMMARY OF THE INVENTION

Problems to be Solved by the Invention

In such vehicle lamps, when external light enters the lamp chamber through the lamp lens and is reflected by the light emitting layer, and the reflected external light is emitted from inside the lamp chamber through the lamp lens to the outside, an image from outside may be seen in the lamp chamber through the lamp lens in some cases (see external light L4 and human vision I.P. in FIG. 1).

Moreover, in such vehicle lamps, when the external light is transmitted through the lamp lens, enters the lamp chamber and is reflected by the light emitting layer, the reflected external light hits an object in the lamp chamber and is reflected, the reflected light follows the same route, is transmitted through the lamp lens, and is emitted to the outside and then, the object in the lamp chamber may be seen through the lamp lens in some cases.

The aforementioned phenomenon is undesirable in terms of appearance as a vehicle lamp. Therefore, it is important for such vehicle lamp to suppress such a phenomenon that images from outside is seen in the lamp chamber through the lamp lens, an object in the lamp chamber is seen through the lamp lens, or the like, that is, to make the objects in the lamp chamber invisible. The above phenomenon is more prominent when a reflection layer is provided in the light emitting layer.

The problem to be solved by the present invention is to provide a vehicle lamp that can make objects in the lamp chamber invisible.

Means for Solving the Problem

The vehicle lamp of the present invention is characterized by including a lamp housing and a lamp lens forming a lamp chamber, and an excitation-light irradiation unit, a light conversion unit, and an optical filter disposed in the lamp chamber, in which the excitation-light irradiation unit emits excitation light to the light conversion unit, the light conversion unit causes secondary light to be emitted by the excitation light emitted from the excitation-light irradiation unit and the secondary light to be emitted to a side of the lamp lens, and an optical filter transmits the excitation light and absorbs the secondary light.

In the vehicle lamp of the present invention, it is preferable that the optical filter is disposed between the excitation-light irradiation unit and the light conversion unit, at a position out of an emission range of the secondary light.

In the vehicle lamp of the present invention, it is preferable that the light conversion unit is disposed at an angle larger than 0° with respect to a normal line of an emission direction of the secondary light.

In the vehicle lamp of the present invention, it is preferable that the light conversion unit is disposed at an angle larger than 0° with respect to the vertical.

In the vehicle lamp of the present invention, it is preferable that the excitation-light irradiation unit has an excitation light source that emits excitation light and an excitation-light final irradiation surface that finally irradiates the light conversion unit with the excitation light emitted from the excitation light source, the light conversion unit has a light emitting film that emits secondary light by the excitation light emitted from the excitation-light final irradiation surface, a reflection film that causes the secondary light emitted from the light emitting film to be reflected to a side of the light emitting film, and a secondary-light emitting surface that causes the secondary light to be emitted to a side of the lamp lens, in which the optical filter is disposed at a position between the excitation-light final irradiation surface of the excitation-light irradiation unit and the secondary-light emitting surface of the light conversion unit and out of the secondary-light emitting surface on a front view seen from a direction opposite to an emission direction of the secondary light.

In the vehicle lamp of the present invention, it is preferable that the light conversion unit is disposed in a state where the secondary-light emitting surface is faced downward at an angle larger than 0° with respect to a normal line of the emission direction of the secondary light, and the optical filter and the excitation-light irradiation unit are disposed on a lower side with respect to the light conversion unit.

In the vehicle lamp of the present invention, it is preferable that the light conversion unit is disposed in a state where the secondary-light emitting surface is faced downward at an angle larger than 0° with respect to the vertical, and the optical filter and the excitation-light irradiation unit are disposed on the lower side with respect to the light conversion unit.

In the vehicle lamp of the present invention, it is preferable that the lamp lens is constituted by a red lens, the excitation light has a dominant wavelength shorter than 500 nm, the secondary light has a dominant wavelength longer than 500 nm, and the optical filter has transmittance of 50% or more for a part of the excitation light in a wavelength range of the excitation light from 200 nm to 500 nm and has transmittance of 50% or less for a part of the secondary light in a wavelength range of the secondary light from 500 nm to 800 nm.

In the vehicle lamp of the present invention, it is preferable that at least a surface of the lamp housing facing the lamp chamber is black in color.

Effect of the Invention

The vehicle lamp of the present invention can make objects in the lamp chamber invisible.

BRIEF DESCRIPTION OF THE DRAWINGS

FIG. 7(A) is an explanatory diagram illustrating transmittance of the optical filter, where a vertical axis indicates transmittance (%) of the optical filter and a horizontal axis indicates a wavelength (nm). FIG. 7(B) is an explanatory diagram illustrating emission intensity (%) when there is no optical filter (see solid-line curve) and the emission intensity (%) after transmission through the optical filter (see dashed curve), in which the vertical axis indicates emission intensity (%) and the horizontal axis indicates the wavelength (nm).

FIG. 8(A) is a schematic longitudinal sectional view (schematic longitudinal sectional view corresponding to FIG. 1). FIG. 8(B) is a B arrow view in FIG. 8(A).

FIG. 22(A) is a partially enlarged schematic longitudinal sectional view illustrating the light emitting panel. FIG. 22(B) is a partially enlarged explanatory view illustrating an optical path of the excitation light and an optical path of the secondary light in the light emitting panel.

MODE FOR CARRYING OUT THE INVENTION

Hereinafter, five examples of Embodiments (examples) of a vehicle lamp according to the present invention will be described in detail on the basis of drawings. In the description, front, back, down, left, and right denote the front, rear, up, down, left, and right when the vehicle lamp according to the present invention is mounted on a vehicle. In FIGS. 14 to 16 and FIGS. 19 to 21, the sign "F" is for "front", "B" is for "back", "U" is for "up", "DE" is for "down", "L" is for "left", and "R" is for "right". Here, a front surface is a surface on a rear side of a vehicle, and a rear surface is a surface on a front side of the vehicle. Note that the drawings are schematic diagrams in which main components are illustrated while illustration of components other than the main components is omitted. In addition, hatching on a part of the components is omitted.

Explanation of Configuration of Embodiment 1

FIGS. 1 to 8 illustrate Embodiment 1 of the vehicle lamp according to the present invention. Hereinafter, a configuration of the vehicle lamp according to this Embodiment 1 will be described.

Explanation of Vehicle Lamp 1A

Figure 1:
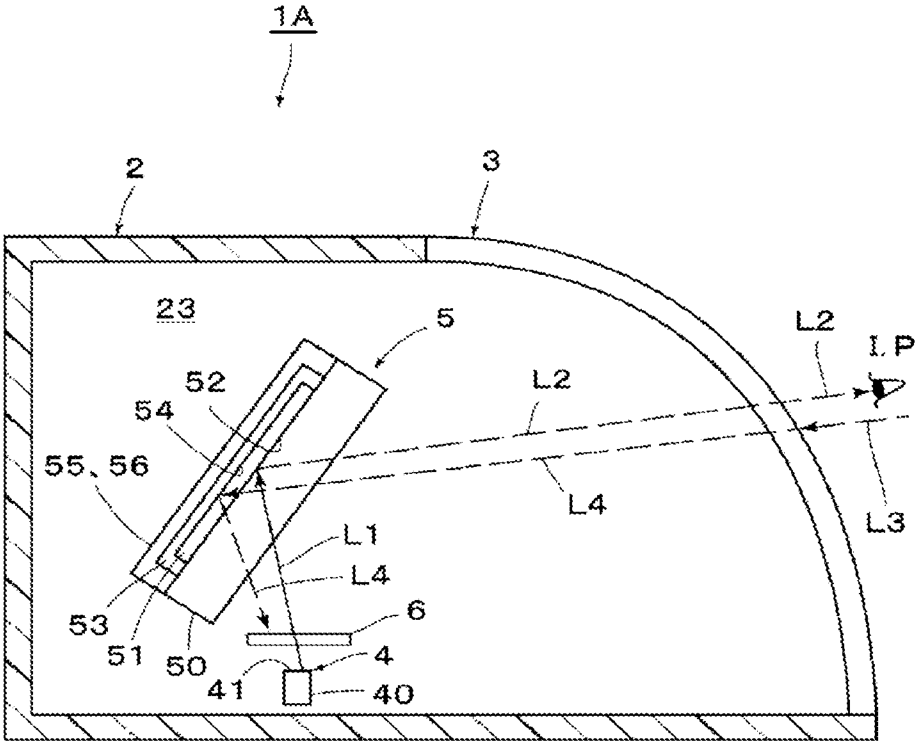
FIG. 1 is a schematic longitudinal sectional view illustrating Embodiment 1 of a vehicle lamp according to the present invention.

In FIG. 1, reference numeral 1A denotes the vehicle lamp according to this Embodiment 1. The vehicle lamp 1A is, in this example, a tail lamp that constitutes a rear combination lamp. Note that the vehicle lamp 1A may be a stop lamp, a tail/stop lamp or a turn-signal lamp in addition to the tail lamp. The vehicle lamp 1A is mounted on both left and right sides on a rear part of a vehicle (not shown), respectively.

As shown in FIG. 1, the vehicle lamp 1A includes a lamp housing 2, a lamp lens 3, an excitation-light irradiation unit 4, a light conversion unit 5, and an optical filter 6.

Explanation of Lamp Housing 2

The lamp housing 2 is constituted by a non-transmissive member (such as a resin member). The lamp housing 2 is black in this example. An inner surface of the lamp housing 2 (surface facing the lamp chamber 23) only needs to be black. The lamp housing 2 may be in a color other than black.

Explanation of Lamp Lens 3

The lamp lens 3 is constituted by a light-transmissive resin member such as PC and PMMA. The lamp lens 3 is a transparent outer cover, an outer lens or the like. The lamp lens 3 is attached to the lamp housing 2. As a result, the lamp housing 2 and the lamp lens 3 form the lamp chamber 23 as shown in FIG. 1.

Explanation of Excitation-Light Irradiation Unit 4

The excitation-light irradiation unit 4 is disposed in the lamp chamber 23, as shown in FIG. 1. The excitation-light irradiation unit 4 has an excitation light source 40 and an excitation-light final irradiation surface 41.

The excitation light source 40 is one or more blue LEDs, and the blue LED with a dominant wavelength of 450 nm is used. Light sources other than the blue LEDs such as LDs (semiconductor lasers) may be used as the excitation light source 40.

Figure 3:
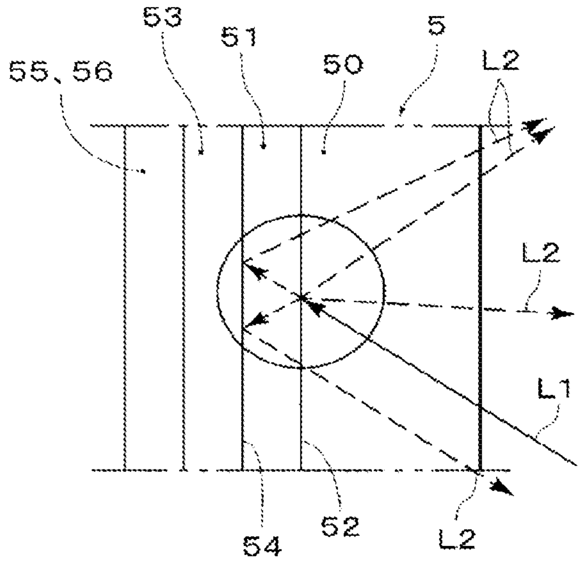
FIG. 3 is a partially enlarged explanatory view of an optical path of excitation light and an optical path of secondary light in the light conversion unit.

The excitation light source 40 emits excitation light L1 (see solid-line arrows in FIG. 1 and FIG. 3). The excitation light L1 emitted from the blue LED excitation light source 40 is blue light with the dominant wavelength of 450 nm. The excitation light L1 may be violet light or ultraviolet light with a wavelength shorter than that of the blue light.

Figure 4:
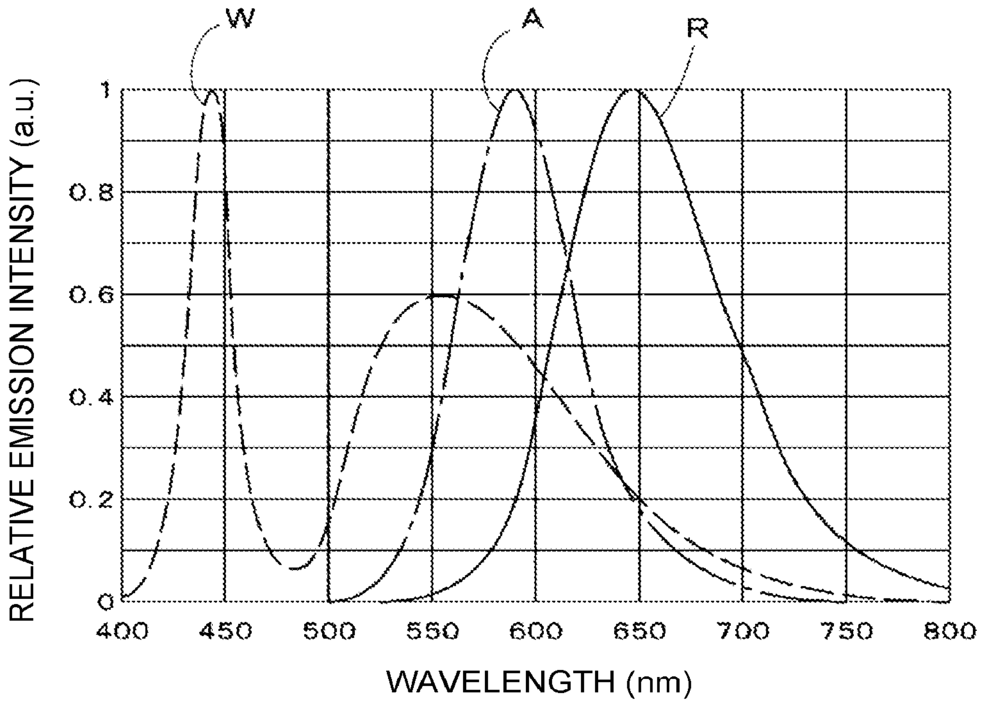
FIG. 4 is an explanatory view illustrating dominant wavelengths of white light, yellow-orange (amber) light, and red light. A vertical axis indicates relative emission intensity (a.u.) and a horizontal axis indicates a wavelength (nm).

Here, white light W shown in FIG. 4 (see a dashed curved line in FIG. 4) is obtained by combining the blue LED excitation light source 40 and a yellow phosphor. In other words, the white light W is obtained by mixing the blue light emitted from the blue LED excitation light source 40 and the yellow light emitted from the yellow phosphor excited by the blue light. The dominant wavelength of this white light W is 450 nm. The dominant wavelength of the blue-light excitation light L1 emitted from the blue LED excitation light source 40 approximately matches the dominant wavelength of the aforementioned white light W at 450 nm. As described above, the dominant wavelength of the blue-light excitation light L1 emitted from the blue LED excitation light source 40 is shorter than 500 nm.

The excitation-light final irradiation surface 41 is provided on a surface of the excitation light source 40 that faces a secondary-light emitting surface 52 of the light conversion unit 5 described below. The excitation-light final irradiation surface 41 finally emits the excitation light L1 emitted from the excitation light source 40 to the light conversion unit 5.

The excitation light source 40 is disposed on the lamp lens 3 side and on the lower side with respect to the light conversion unit 5. As a result, the excitation-light final irradiation surface 41 is disposed on the lamp lens 3 side and on the lower side with respect to the secondary-light emitting surface 52 of the light conversion unit 5. The excitation-light final irradiation surface 41 is disposed in parallel to an emission direction D of the secondary light L2. In other words, the excitation-light final irradiation surface 41 is disposed in a horizontal direction.

Explanation of Light Conversion Unit 5

Figure 2:
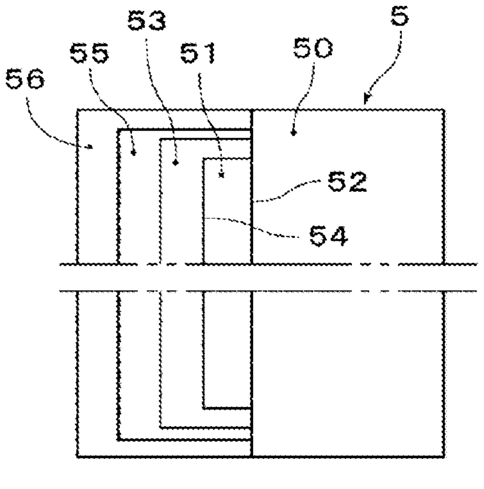
FIG. 2 is a partially enlarged schematic longitudinal sectional view illustrating a light conversion unit.

The light conversion unit 5 is disposed in the lamp chamber 23, as shown in FIG. 1. The light conversion unit 5 has, as shown in FIG. 1, FIG. 2, and FIG. 3, a substrate (support substrate) 50, a light emitting film (light emitting layer) 51, the secondary-light emitting surface 52, a reflection film (reflection layer) 53, a reflection surface 54, and sealing materials 55 and 56.

The light conversion unit 5 is disposed in a state of facing downward at a disposition angle θ3 larger than 0° (approximately 45° in this example) with respect to a normal line N1 of the emission direction D of the secondary light L2. That is, the light conversion unit 5 is disposed in a state of facing downward at a disposition angle θ3 larger than 0° (approximately 45° in this example) with respect to the vertical.

The substrate 50 is constituted by a light-transmissive resin member such as PMMA or PC, or light-transmissive glass that transmits the excitation light L1 and secondary light L2 described below. The substrate 50 can be flexible or rigid. The substrate 50 has a rectangular, square or free-form plate shape.

The light emitting film 51 is formed (deposited) on one surface of the substrate 50 (surface on a side opposite to a surface facing the lamp lens 3). For the light emitting film 51, an organic material with a dominant wavelength of 630 nm is used. The material of the light emitting film 51 may be a material consisting of at least any one of an organic fluorescent material, an organic phosphorescent material, or an inorganic fluorescent material. The light emitting film 51 emits the secondary light (see dashed arrows in FIG. 1 and FIG. 3) in all directions (see a circle in FIG. 3) by the excitation light L1 emitted from the excitation-light final irradiation surface 41 of the excitation-light irradiation unit 4.

The secondary light L2 is yellow-orange light A indicated by a one-dotted chain curve in FIG. 4 or red light R indicated by a solid curve in FIG. 4. The dominant wavelength of the yellow-orange light A is 590 nm, which is longer than 500 nm. The dominant wavelength of the red light R is 650 nm, which is longer than 500 nm. As described above, the dominant wavelength of the secondary light L2 is longer than 500 nm and longer than the dominant wavelength of the excitation light L1 of 450 nm. The secondary light L2 in this example is the red light R for the tail lamp. The red light R is used for stop lamps and tail/stop lamps in addition to tail lamps. The yellow-orange light A is used for turn signal lamps.

Figure 8:
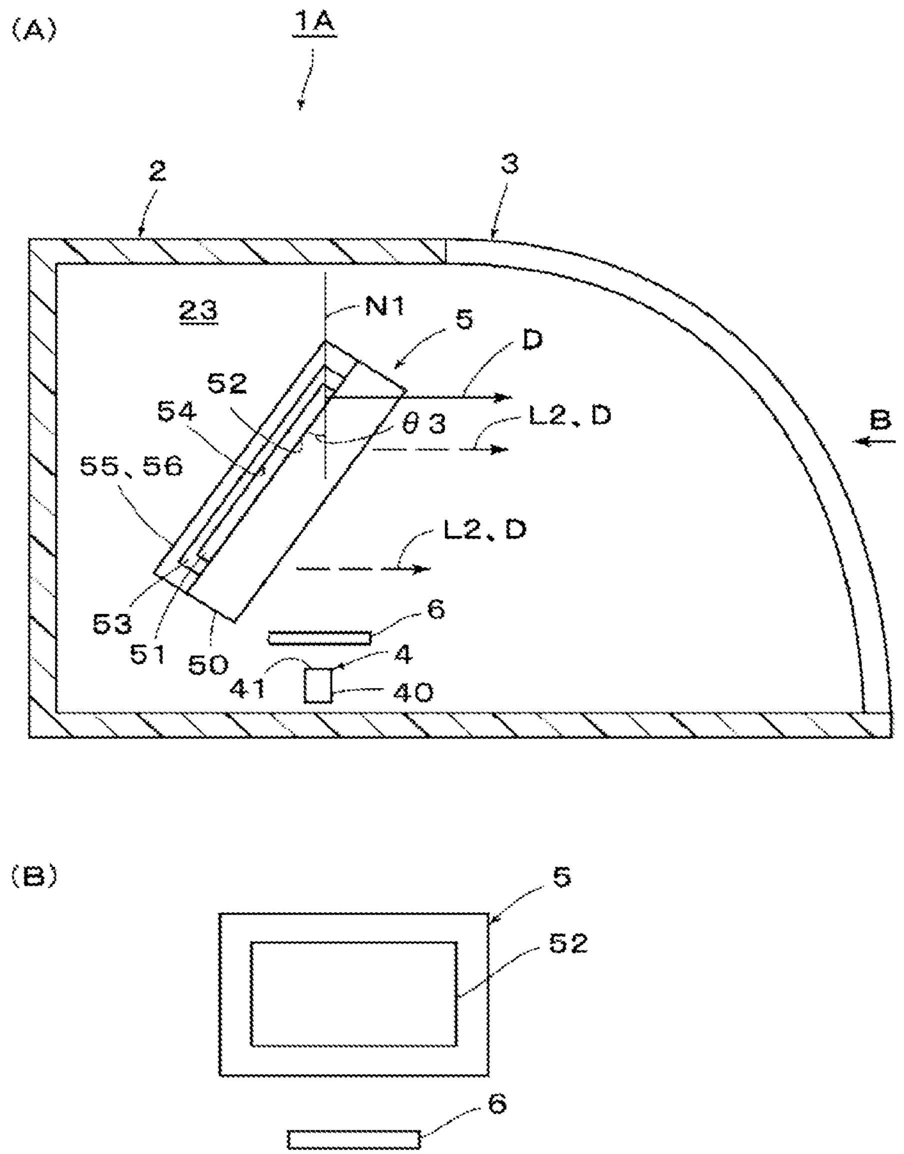
FIG. 8 are explanatory diagrams illustrating a state of disposition of the excitation-light irradiation unit, the light conversion unit, and the optical filter.

The light emitting film 51 has the secondary-light emitting surface 52. The secondary-light emitting surface 52 is provided on a surface on the substrate 50 side (surface on the lamp lens 3 side) of the light emitting film 51. The secondary-light emitting surface 52 causes the secondary light L2 to be emitted to the lamp lens 3 side. The secondary-light emitting surface 52 has a rectangular, square or free-form planar shape that is one size smaller than the substrate 50. The emission direction D of the secondary light L2 emitted from the secondary-light emitting surface 52 to the lamp lens 3 side is horizontal, as shown in FIG. 8.

The secondary-light emitting surface 52 is disposed in a state of facing downward at a disposition angle θ3 larger than 0° (approximately 45° in this example) with respect to the normal line N1 of the emission direction D of the secondary light L2 on the basis of the disposition of the light conversion unit 5. That is, the secondary-light emitting surface 52 is disposed in a state of facing downward at the disposition angle θ3 larger than 0° (approximately 45° in this example) with respect to the vertical.

The vehicle lamp 1A can obtain rectangular, square or free-form shaped surface light emission by the secondary light L2 emitted from the secondary-light emitting surface 52, which has a rectangular surface shape. The total emitting area of the secondary-light emitting surface 52 is 10 mm 2 or more. As a result, the vehicle regulations for brightness can be satisfied.

The reflection film 53 is formed (deposited) on one surface of the substrate 50 so as to cover the light emitting film 51. The reflection film 53 is made of a reflective material with reflectance of 20% or more in the visible-light wavelength region, that is, a metallic material such as aluminum, silver and other metals or an alloy of these metals.

Figure 5:
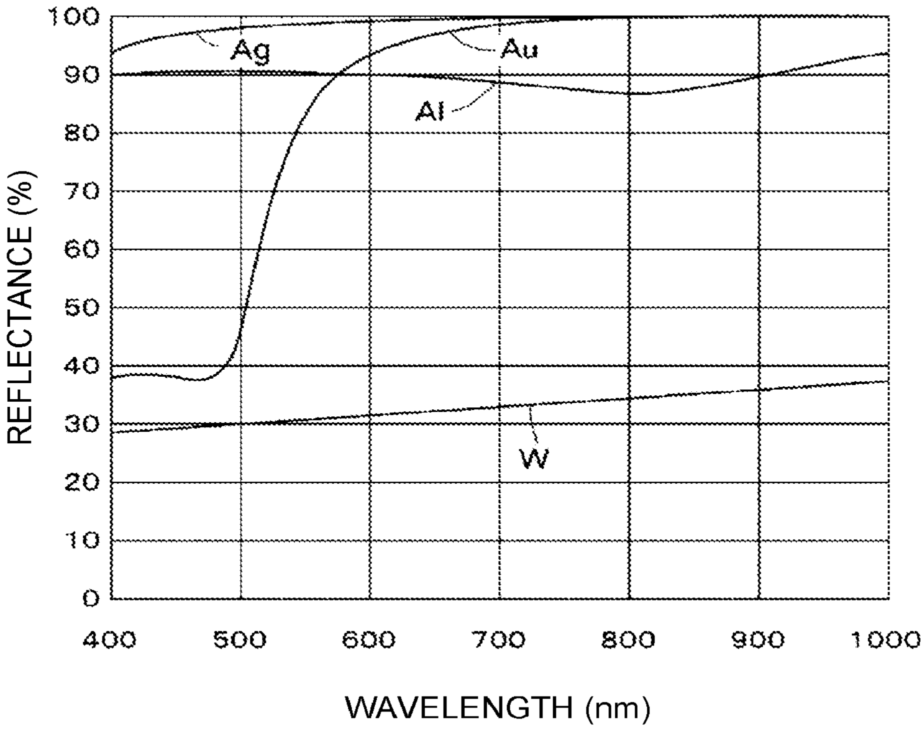
FIG. 5 is an explanatory view illustrating reflectance by materials of reflection films. A vertical axis indicates reflectance (%) and a horizontal axis indicates a wavelength (nm).

The metallic material of the reflection film 53 has the reflectance shown in FIG. 5. In FIG. 5, the reflectance at 400 nm, a lower boundary of the visible-light wavelength region for tungsten (W), which has low reflectance, is 28% or more. As a result, even if the metallic material of the reflection film 53 is tungsten (W), the reflectance in the visible-light wavelength region is more than 20%. As a result, the reflection film 53 can absorb variations in reflectance even if these variations occur due to manufacturing tolerances.

The reflection film 53 has a reflection surface 54. The reflection surface 54 is provided on a surface of the substrate 50 and the light emitting film 51 side (surface on the lamp lens 3 side) of the reflection film 53. The reflection surface 54 reflects the secondary light L2 emitted from the light emitting film 51 toward the light emitting film 51 side.

The sealing materials 55 and 56 seal the light emitting film 51 and the reflection film 53 together with the substrate 50. The sealing materials 55 and 56 are constituted by a silicone resin or SiN film or the like 55 and an aluminum foil 56. The sealing materials 55 and 56 are not limited to this example.

Explanation of Lamp Lens 3 of Red Lens

The lamp lens 3 is constituted by a red lens. The lamp lens 3 constituted by the red lens has characteristics of a spectral transmittance curve shown in FIG. 6.

Figure 6:
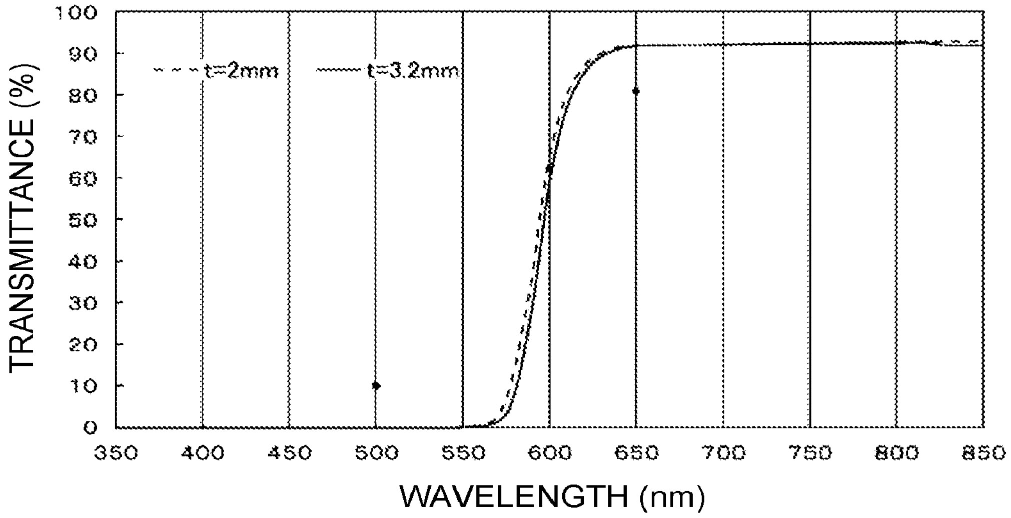
FIG. 6 is an explanatory view illustrating spectral transmittance of a lamp lens (red lens); A vertical axis indicates transmittance (%) and a horizontal axis indicates a wavelength (nm).

In FIG. 6, a lateral axis indicates a wavelength of light (unit nm) and a vertical axis indicates transmittance of the light (unit %). In FIG. 6, the lamp lens 3 having the characteristics of the spectral transmittance curve indicated by a dashed line has a thickness of 2 mm. The lamp lens 3 having the characteristics of the spectral transmittance curve indicated by a solid line has a thickness of 3.2 mm. Furthermore, red density of the lamp lens 3 indicated by the dashed line is equivalent to the red density of the lamp lens 3 indicated by the solid line. If the thickness or the red density of the lamp lens 3 is different, the characteristic curve will also be different. In FIG. 6, a part where the dashed line and the solid line overlap is illustrated by solid lines.

The thicknesses of 2 mm and 3.2 mm of the lamp lens 3 are typical lamp lens thicknesses of the vehicle lamp 1A. The red density of the lamp lens 3 described above is also the typical red density of the lamp lens of the vehicle lamp 1A. The thickness and red density of the lamp lens 3 are not particularly limited.

As shown in FIG. 6, the lamp lens 3 transmits almost no light with the wavelength of 550 nm or less, since the transmittance of the light with the wavelength of 550 nm or less is close to 0%. On the other hand, the lamp lens 3 transmits most of the light with the wavelength of 650 nm or more, as shown in FIG. 6, since the transmittance of the light with the wavelength of 650 nm or more is close to 90%.

Here, a case where a 10% variation occurs in the transmittance of the lamp lens 3 due to manufacturing tolerances will be explained. In this case, the transmittance of the excitation light L1 with the wavelength of 500 nm is 10% (see a small black circle above the wavelength of 500 nm in FIG. 6), and the transmittance of the secondary light L2 with the wavelength of 650 nm is 80% (see a small black circle above the wavelength of 650 nm in FIG. 6).

The lamp lens 3, which is constituted by a red lens, has transmittance of nearly 0% for light with a wavelength of 550 nm or less and nearly 90% for light with a wavelength of 650 nm or more and thus, the variations in transmittance caused by manufacturing tolerances can be absorbed.

As a result, the lamp lens 3 only needs to be constituted by a red lens in which the transmittance of the excitation light L1 is 10% or less in the wavelength region of the excitation light L1 with the dominant wavelength shorter than 500 nm and the transmittance of the secondary light L2 is 80% or more in the wavelength region of the secondary light L2 with the dominant wavelength longer than 500 nm.

As described above, the lamp lens 3 absorbs the excitation light L1, whose dominant wavelength is shorter than 500 nm, and transmits the secondary light L2, whose dominant wavelength is longer than 500 nm. As a result, the lamp lens 3 absorbs the excitation light L1 whose dominant wavelength is shorter than 500 nm such as blue light, for example, and does not emit it to an outside from inside the lamp chamber 23, while the secondary light L2 whose dominant wavelength is longer than 500 nm such as the red light R, for example, can be transmitted and emitted outward from inside the lamp chamber 23.

Explanation of Optical Filter 6

Figure 7:
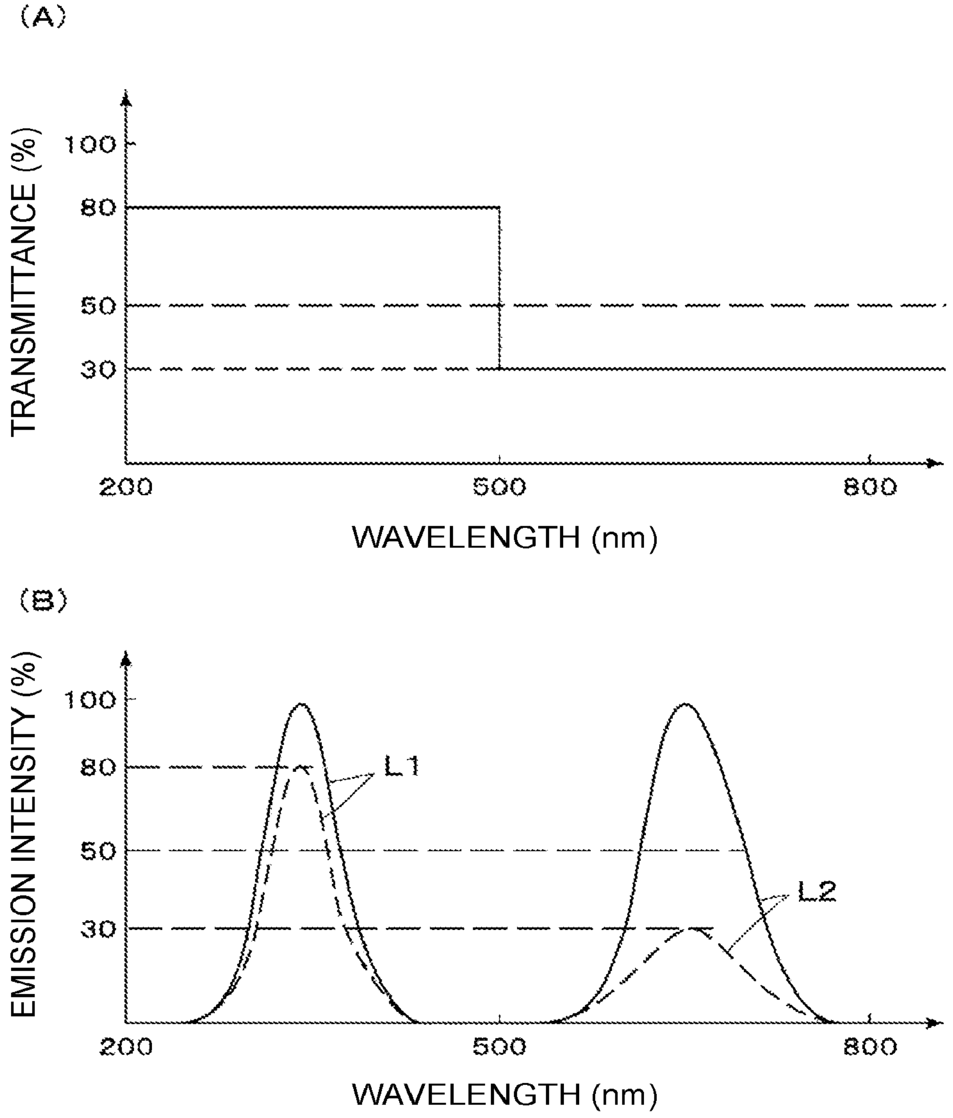
FIG. 7 are explanatory diagrams illustrating characteristics of an optical filter.

The optical filter 6 is disposed in the lamp chamber 23, as shown in FIGS. 1, 7, and 8. The optical filter 6 is disposed between the excitation-light final irradiation surface 41 of the excitation-light irradiation unit 4 and the secondary-light emitting surface 52 of the light conversion unit 5. The optical filter 6 and the excitation-light irradiation unit 4 are disposed on the lower side with respect to the light conversion unit 5.

The optical filter 6 is disposed at a position out of the emission range of the secondary light L2, as shown in FIGS. 1 and 8(A). In other words, the optical filter 6 is disposed at the position out of the secondary-light emitting surface 52 of the light conversion unit 5 on the front view seen from the direction opposite to the emission direction of the secondary light L2, as shown in FIG. 8(B).

The optical filter 6 transmits the excitation light L1 and absorbs the secondary light L2. In other words, the optical filter 6 has transmittance of 80% in the wavelength range from 200 nm to 500 nm and transmittance of 30% in the wavelength range from 500 nm to 800 nm, as shown in FIG. 7(A).

Thus, as shown in FIG. 7(B), the excitation light L1 (blue light, for example) goes from emission intensity of 100% (see the solid line in FIG. 7(B)) before passing through the optical filter 6 to 80% (see the dashed line in FIG. 7(B)) after passing through the optical filter 6. On the other hand, the secondary light L2 (red light R, for example) goes from the emission intensity of 100% (see the solid line in FIG. 7(B)) before passing through the optical filter 6 to 30% (see the dashed line in FIG. 7(B)) after passing through the optical filter 6.

As a result, the optical filter 6 has transmittance of 50% or more for a part of the excitation light L1 (blue light, for example) and 50% or less for a part of the secondary light L2 (red light R, for example). As described above, the optical filter 6 transmits most of the excitation light L1 and absorbs most of the secondary light L2.

As a result, the optical filter 6 is disposed, as described above, at a position out of the emission range of the secondary light L2 and does not interfere with emission of the secondary light L2, that is, at a position out of the secondary-light emitting surface 52 of the light conversion unit 5 on the front view seen from the direction opposite to the emission direction of the secondary light L2.

Explanation of Action of Embodiment 1

The vehicle lamp 1A according to this Embodiment 1 has a configuration as described above, and actions thereof will be described below.

First, the excitation light source 40 of the excitation-light irradiation unit 4 is turned on. Then, the excitation light L1 is emitted from the excitation light source 40. The excitation light L1 is emitted from the excitation-light final irradiation surface 41 of the excitation-light irradiation unit 4 toward the light conversion unit 5. The excitation light L1 is transmitted through the substrate 50 of the light conversion unit 5 and emitted to the light emitting film 51.

The light emitting film 51 emits the secondary light L2 in all directions by the excitation light L1, as shown in FIG. 3.

A part of the secondary light L2 passes through the light emitting film 51 and is reflected by the reflection surface 54 to the light emitting film 51 side. The reflected secondary light L2 passes through the light emitting film 51 again and is emitted from the secondary-light emitting surface 52 to the lamp lens 3 side. The remainder of the secondary light L2 is not reflected by the reflection surface 54 but is emitted from the secondary-light emitting surface 52 to the lamp lens 3 side.

The excitation light L1 having reached the reflection surface 54 through the light emitting film 51 is reflected by the reflection surface 54 to the light emitting film 51 side and excites the secondary light L2 in the light emitting film 51. The secondary light L2 excited by the excitation light L1 is emitted from the light emitting film 51 and is emitted from the secondary-light emitting surface 52 to the lamp lens 3 side.

The secondary light L2 (red light R) emitted from the secondary-light emitting surface 52 to the lamp lens 3 side passes through the substrate 50, through the inside of the lamp chamber 23, through the lamp lens 3, and is emitted to the outside of the vehicle lamp 1A in a predetermined light distribution pattern of a tail lamp. At this time, the vehicle lamp 1A can obtain rectangular, square or free-form shaped surface light emission.

As shown in FIG. 1, external light (natural or artificial light) L3 (see the one-dotted chain arrow in FIG. 1) enters the lamp chamber 23 through the lamp lens 3 of the red lens from outside the vehicle lamp 1A. At this time, the external light L4 (see the dashed arrow in FIG. 1) transmitted through the lamp lens 3 of the red lens is light of a red component (red light).

The external light L4 of the red component entering the lamp chamber 23 is reflected by the reflection surface 54 of the light conversion unit 5. The reflected external light L4 of the red component advances in the lamp chamber 23 toward the excitation-light irradiation unit 4 side and is absorbed by the optical filter 6 on the way. Here, the optical filter 6 has transmittance of 50% or less for a part of the secondary light L2 in the wavelength range of the secondary light L2 from 500 nm to 800 nm. As a result, most of the reflected external light L4 of the red component is absorbed by the optical filter 6.

A case in which the optical filter 6 is not disposed in FIG. 1 will be described here. The reflected external light L4 of the red component advances in the lamp chamber 23 toward the excitation-light irradiation unit 4 side and is reflected by the excitation-light irradiation unit 4. This reflected external light L4 of the red component reversely follows the optical path described above, is reflected again by the reflection surface 54 of the light conversion unit 5, passes through the lamp lens 3, and is emitted to the outside. When the external light L4 of the red component emitted to the outside enters a person's field of view I.P., an image of the outside is visible in the lamp chamber 23 through the lamp lens 3 as explained in Patent Literature 1 described above.

The vehicle lamp 1A according to this Embodiment 1 has the optical filter 6 that transmits the excitation light L1 and absorbs the secondary light L2 provided in the lamp chamber 23 and thus, most of the reflected external light L4 of the red component is absorbed by the optical filter 6, and such a phenomenon that the image of the outside is visible in the lamp chamber 23 through the lamp lens 3 can be suppressed.

Explanation of Effects of Embodiment 1

The vehicle lamp 1A according to this Embodiment 1 has the configuration and the action described above, and the effect thereof will be described below.

The vehicle lamp 1A according to this Embodiment 1 has the optical filter 6 that transmits the excitation light L1 and absorbs the secondary light L2 provided in the lamp chamber 23. As a result, the vehicle lamp 1A according to this Embodiment 1 can absorb most of the external light L3, which is the external light L4 of the red component transmitted through the lamp lens 3 of the red lens from outside the vehicle lamp 1A and entering into the lamp chamber 23, with the optical filter 6. As a result, the vehicle lamp 1A according to this Embodiment 1 can suppress the phenomenon that the image of the outside is visible in the lamp chamber 23 through the lamp lens 3 and make the objects in the lamp chamber 23 invisible, as compared with Patent Literature 1 described above.

In the vehicle lamp 1A according to this Embodiment 1, the optical filter 6 is disposed at a position between the excitation-light irradiation unit 4 and the light conversion unit 5 and out of the emission range of the secondary light L2. That is, in the vehicle lamp 1A according to this Embodiment 1, the optical filter 6 is disposed at the position between the excitation-light final irradiation surface 41 of the excitation-light irradiation unit 4 and the secondary-light emitting surface 52 of the light conversion unit 5 and out of the secondary-light emitting surface 52 on the front view seen from the direction opposite to the emission direction of secondary light L2.

As a result, the vehicle lamp 1A according to this Embodiment 1 can reduce the ratio of the secondary light L2 from the light conversion unit 5 that is absorbed by the optical filter 6 as much as possible. As a result, the vehicle lamp 1A according to this Embodiment 1 can absorb most of the external light L4 of the red component by the optical filter 6, while it can emit most of the secondary light L2 from the light conversion unit 5 to the outside from the lamp lens 3. In other words, the vehicle lamp 1A according to this Embodiment 1 can suppress the phenomenon that the image of the outside is visible in the lamp chamber 23 through the lamp lens 3 so as to make the objects in the lamp chamber 23 invisible, and can also satisfy vehicle regulations by causing a lot of the secondary light L2 to be emitted from the lamp lens 3.

In the vehicle lamp 1A according to this Embodiment 2, the light conversion unit 5 is disposed in a state of facing downward at the disposition angle θ3 larger than 0° with respect to the normal line N1 (vertical) of the emission direction D of the secondary light L2, that is, at the disposition angle θ3 larger than 0° with respect to the vertical. Moreover, in the vehicle lamp 1A according to this Embodiment 2, the optical filter 6 and the excitation-light irradiation unit 4 are disposed on the lower side with respect to the light conversion unit 5.

As a result, in the vehicle lamp 1A according to this Embodiment 2, as shown in FIG. 1, the external light L4 of the red component that is transmitted through the lamp lens 3 of the red lens diagonally below from diagonally above outside the vehicle lamp 1A into the lamp chamber 23 is reflected by the reflection surface 54 of the light conversion unit 5 diagonally below and is absorbed by the optical filter 6.

As a result, in the vehicle lamp 1A according to this Embodiment 2, the external light L4 of the red component that is transmitted through the lamp lens 3 and enters the lamp chamber 23 is reflected by the reflection surface 54 of the light conversion unit 5, is reflected by the excitation-light irradiation unit 4, reversely follows this optical path, is reflected again by the reflection surface 54 of the light conversion unit 5, is transmitted through the lamp lens 3, and is emitted to the outside so that entering into a person's field of view I.P. can be prevented. In other words, the vehicle lamp 1A according to this Embodiment 2 can prevent the phenomenon that an image of the outside is visible in the lamp chamber 23 through the lamp lens 3 due to external light L3 (L4) and can make the objects in the lamp chamber 23 invisible.

In the vehicle lamp 1A according to this Embodiment 1, the optical filter 6 has transmittance of 50% or less for a part of the secondary light L2 (red light R, for example) in the wavelength range of the secondary light L2 from 500 nm to 800 nm. As a result, the vehicle lamp 1A according to this Embodiment 1 can absorb most of the external light L4 of the red component transmitted through the lamp lens 3 of the red lens in the external light L3 and thus, the phenomenon that the image of the outside is visible in the lamp chamber 23 through the lamp lens 3 can be further suppressed, and the inside of the lamp chamber 23 can be made even more invisible.

In the vehicle lamp 1A of this Embodiment 1, the optical filter 6 has transmittance of 50% or more for a part of the excitation light L1 (blue light, for example) in the wavelength range of the excitation light L1 from 200 nm to 500 nm. As a result, in the vehicle lamp 1A according to this Embodiment 1, even if the optical filter 6 is disposed between the excitation-light irradiation unit 4 and the light conversion unit 5, the optical filter 6 can transmit most of the excitation light L1 emitted from the excitation-light irradiation unit 4 toward the light conversion unit 5. As a result, the vehicle lamp 1A of this Embodiment 1 can realize both invisibility and satisfaction of the vehicle regulations.

In the vehicle lamp 1A according to this Embodiment 1, at least the inner surface of the lamp housing 2 is black. As a result, the vehicle lamp 1A according to this Embodiment 1 can further suppress the phenomenon that the image of the outside is visible in the lamp chamber 23 through the lamp lens 3 and make the objects in the lamp chamber 23 invisible.

Explanation of Configuration, Action, and Effects of Embodiment 2

Figure 9:
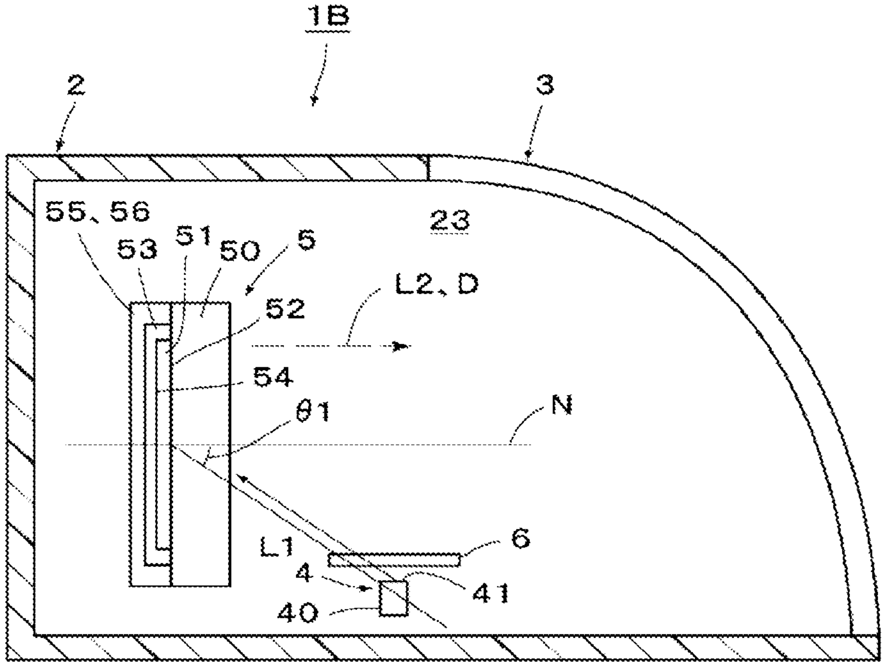
FIG. 9 is a schematic longitudinal sectional view illustrating Embodiment 2 of the vehicle lamp according to the present invention.

FIG. 9 illustrates Embodiment 2 of the vehicle lamp according to the present invention. Hereinafter, the configuration, actions, and effects of a vehicle lamp 1B according to this Embodiment 2 will be described. In the drawing, the same reference numerals as those in FIGS. 1 to 8 indicate the same items.

The vehicle lamp 1A according to this Embodiment 1 described above is an example in which the light conversion unit 5 is disposed in a state of facing downward at the disposition angle θ3 larger than 0° (approximately 45° in this example) with respect to the normal line N1 of the emission direction D of the secondary light L2, that is, in a state of facing downward at the disposition angle θ3 larger than 0° (approximately 45° in this example) with respect to the vertical. In contrast, the vehicle lamp 1B according to this Embodiment 2 is an example in which the light conversion unit 5 is disposed in a state in the direction of the normal line N1 of the emission direction D of the secondary light L2, that is, in a vertical state (perpendicular state).

Moreover, the excitation-light final irradiation surface 41 is within a range (up, down, left, right) of the disposition angle θ1 less than 90° (approximately 45° in this example) with respect to a normal line N drawn from the secondary-light emitting surface 52 in the emission direction D of the secondary light L2. In other words, the excitation-light final irradiation surface 41 and the secondary-light emitting surface 52 face each other.

Since the vehicle lamp 1B according to this Embodiment 2 has the configuration as above, it can achieve the actions and effects similar to the effects of the vehicle lamp 1A according to Embodiment 1 described above.

In the vehicle lamp 1B according to this Embodiment 2, the excitation-light final irradiation surface 41 is within a range (up, down, left, right) of the disposition angle θ1 less than 90° (approximately 45° in this example) with respect to the normal line N drawn from the secondary-light emitting surface 52 in the emission direction D of the secondary light L2. As a result, in the vehicle lamp 1B according to this Embodiment 2, the excitation-light final irradiation surface 41 is disposed on the lamp lens 3 side with respect to the secondary-light emitting surface 52. As a result, the vehicle lamp 1B according to this Embodiment 2 can efficiently cause the excitation light L1 emitted by the excitation light source 40 finally to be emitted from the excitation-light final irradiation surface 41 to the light conversion unit 5 and thus, the secondary light L2 is efficiently excited in the light conversion unit 5 and can be emitted to the lamp lens 3 side, whereby both invisibility and satisfaction of the vehicle regulations can be realized.

Explanation of Configuration, Actions, and Effects of Embodiment 3

Figure 10:
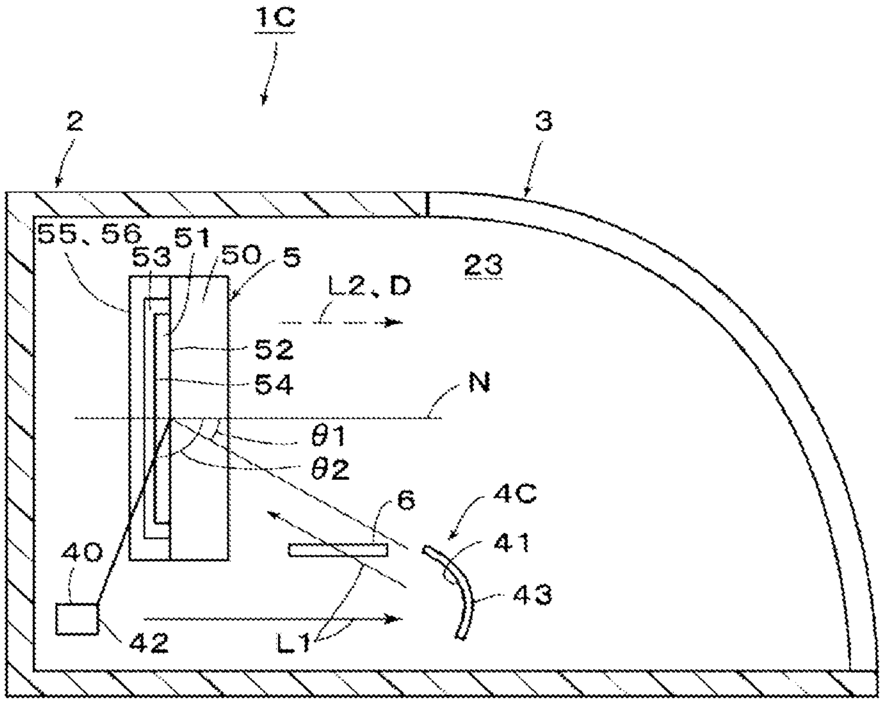
FIG. 10 is a schematic longitudinal sectional view illustrating Embodiment 3 of the vehicle lamp according to the present invention.

FIG. 10 illustrates Embodiment 3 of the vehicle lamp according to the present invention. Hereinafter, the configuration, actions, and effects of a vehicle lamp 1C according to this Embodiment 3 will be described. In the drawing, the same reference numerals as those in FIGS. 1 to 9 indicate the same items.

The vehicle lamp 1C according to this Embodiment 3 is a variation 4C of the excitation-light irradiation unit 4 of the vehicle lamp 1B according to Embodiment 2 described above.

In other words, the excitation light source 40 of the excitation-light irradiation unit 4C is disposed on a side opposite to the lamp lens 3 with respect to the secondary-light emitting surface 52 of the light conversion unit 5. The excitation light source 40 is disposed at the disposition angle θ2 (in this example, 110°), which is 90° or more with respect to the normal line N drawn in the emission direction D from the secondary-light emitting surface 52. On a surface on the lamp lens 3 side of the excitation light source 40, an excitation-light emitting surface 42 is provided.

A reflector 43 as an optical component is disposed on the lamp lens 3 side with respect to the secondary-light emitting surface 52. The reflector 43 has the excitation-light final irradiation surface 41, which is a reflection surface, provided. The excitation-light final irradiation surface 41, which is the reflection surface of the reflector 43, faces the excitation-light emitting surface 42 and the light conversion unit 5, respectively. That is, the excitation-light final irradiation surface 41, which is the reflection surface of the reflector 43, is disposed on the lamp lens 3 side with respect to the secondary-light emitting surface 52 and at the disposition angle θ1, which is less than 90° with respect to the normal line N drawn in the emission direction D from the secondary-light emitting surface 52.

The optical filter 6 is disposed between the excitation-light final irradiation surface 41, which is the reflection surface of the reflector 43 of the excitation-light irradiation unit 4, and the secondary-light emitting surface 52 of the light conversion unit 5.

When the excitation light source 40 is turned on, the excitation light L1 is emitted from the excitation-light emitting surface 42 to the reflector 43, reflected by the excitation-light final irradiation surface 41 of the reflector 43, and finally emitted from the excitation-light final irradiation surface 41 to the light conversion unit 5.

Since the vehicle lamp 1C according to this Embodiment 3 has the configuration and actions as above, it can achieve the effects similar to those of the vehicle lamps 1A, 1B according to Embodiments 1, 2 described above.

Explanation of Configuration, Actions, and Effects of Embodiment 4

Figure 11:
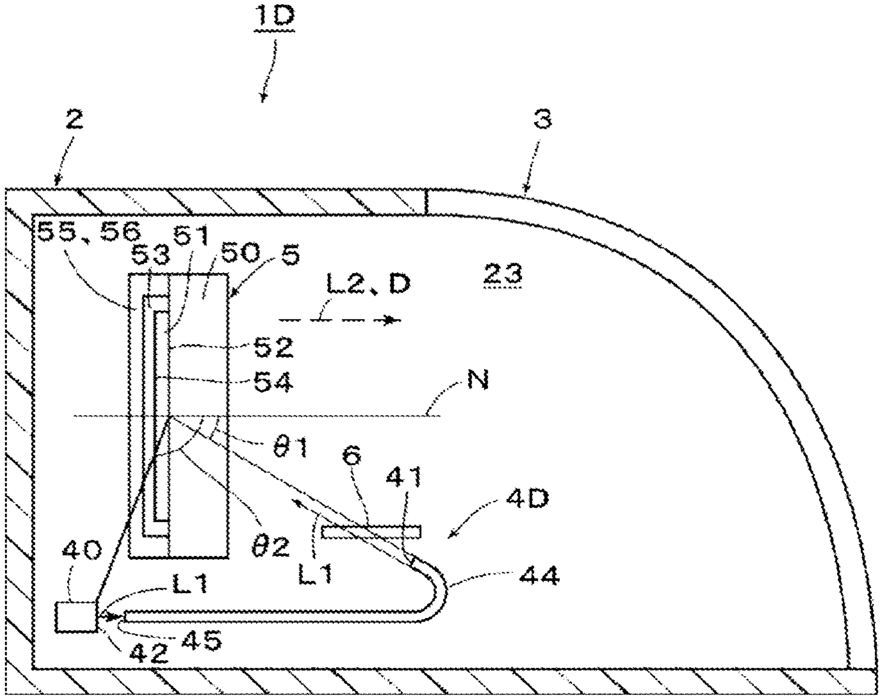
FIG. 11 is a schematic longitudinal sectional view illustrating Embodiment 4 of the vehicle lamp according to the present invention.

FIG. 11 illustrates Embodiment 4 of the vehicle lamp according to the present invention. Hereinafter, the configuration, actions, and effects of the vehicle lamp 1D according to this Embodiment 4 will be described. In the drawing, the same reference numerals as those in FIGS. 1 to 10 indicate the same items.

The vehicle lamp 1D according to this Embodiment 4 is a variation 4D of the excitation-light irradiation unit 4 of the vehicle lamp 1B according to Embodiment 2 described above.

In other words, the excitation light source 40 of the excitation-light irradiation unit 4D is disposed on a side opposite to the lamp lens 3 with respect to the secondary-light emitting surface 52 of the light conversion unit 5. The excitation light source 40 is disposed at the disposition angle θ2 (in this example, 110°), which is 90° or more with respect to the normal line N drawn in the emission direction D from the secondary-light emitting surface 52. On a surface on the lamp lens 3 side of the excitation light source 40, an excitation-light emitting surface 42 is provided.

A light guide 44 as an optical component is disposed between the lamp lens 3 side and the excitation light source 40 with respect to the secondary-light emitting surface 52. On both end surfaces of the light guide 44, an incident surface 45 and the excitation-light final irradiation surface 41, which is the emitting surface, are provided. The light guide 44 has a shape that is bent from the incident surface 45 side to the excitation-light final irradiation surface 41 side, which is the emitting surface. The incident surface 45 of the light guide 44 faces the excitation-light emitting surface 42. The excitation-light final irradiation surface 41, which is the emitting surface of the light guide 44, faces the light conversion unit 5. That is, the excitation-light final irradiation surface 41, which is the emitting surface of the light guide 44, is disposed on the lamp lens 3 side with respect to the secondary-light emitting surface 52 and is also disposed at the disposition angle θ1, which is less than 90° with respect to the normal line N drawn in the emission direction D from the secondary-light emitting surface 52.

The optical filter 6 is disposed between the excitation-light final irradiation surface 41, which is an emitting surface of the light guide 44 of the excitation-light irradiation unit 4D, and the secondary-light emitting surface 52 of the light conversion unit 5.

When the excitation light source 40 is turned on, the excitation light L1 is emitted from the excitation-light emitting surface 42, incident into the light guide 44 from the incident surface 45 of the light guide 44, guided through the light guide 44, and is finally emitted from the excitation-light final irradiation surface 41, which is the emitting surface of the light guide 44, to the light conversion unit 5.

Since the vehicle lamp 1D according to this Embodiment 4 has the configuration and actions as above, it can achieve the effects similar to those of the vehicle lamps 1A, 1B, 1C according to Embodiments 1, 2, 3 described above.

Explanation of Configuration of Embodiment 5 FIGS. 12 to 18 illustrate Embodiment 5 of the vehicle lamp according to the present invention. Hereinafter, a configuration of the vehicle lamp according to this Embodiment 5 will be described.

Explanation of Vehicle Lamp 1E

Figure 12:
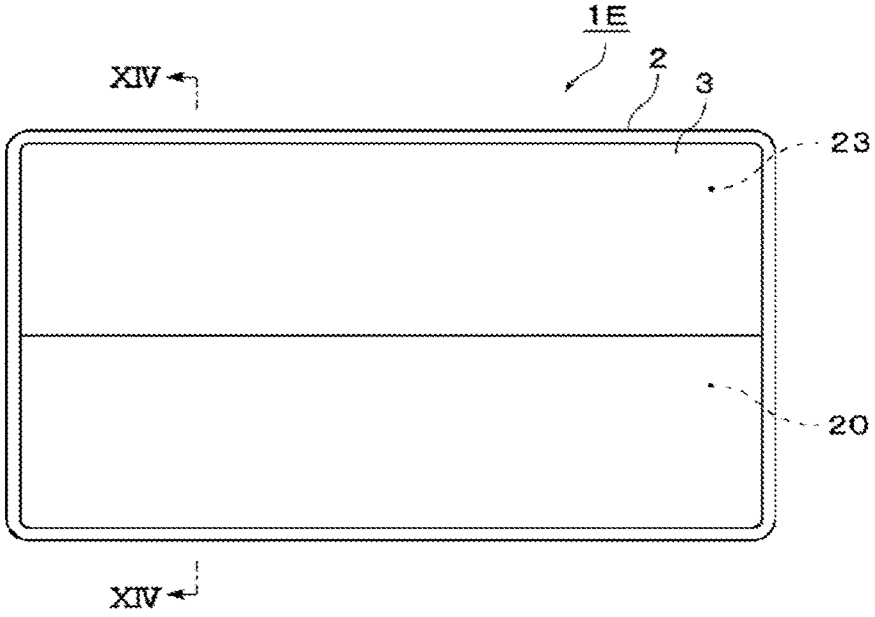
FIG. 12 is a front view of a vehicle lamp when it is not lighted on, illustrating Embodiment 5 of the vehicle lamp according to the present invention.
Figure 13:
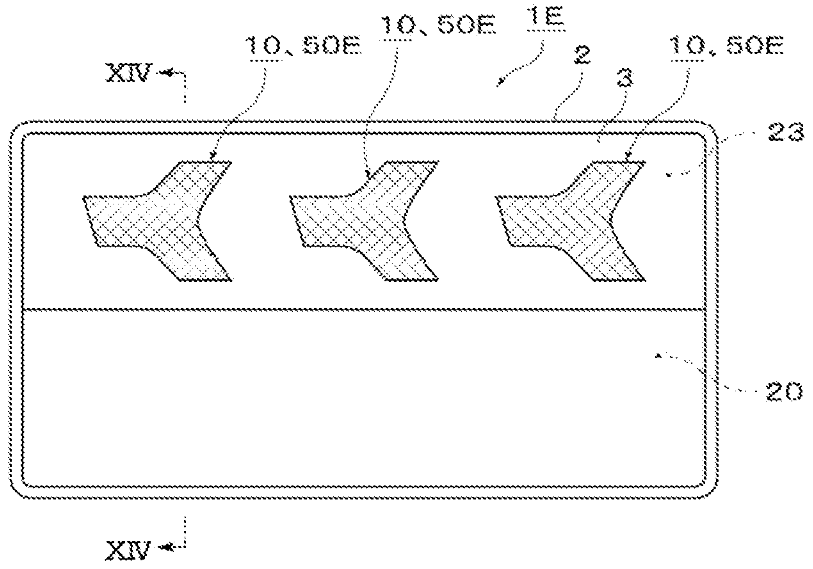
FIG. 13 is a front view of a vehicle lamp illustrating a state where a light emitting panel emits light.
Figure 14:
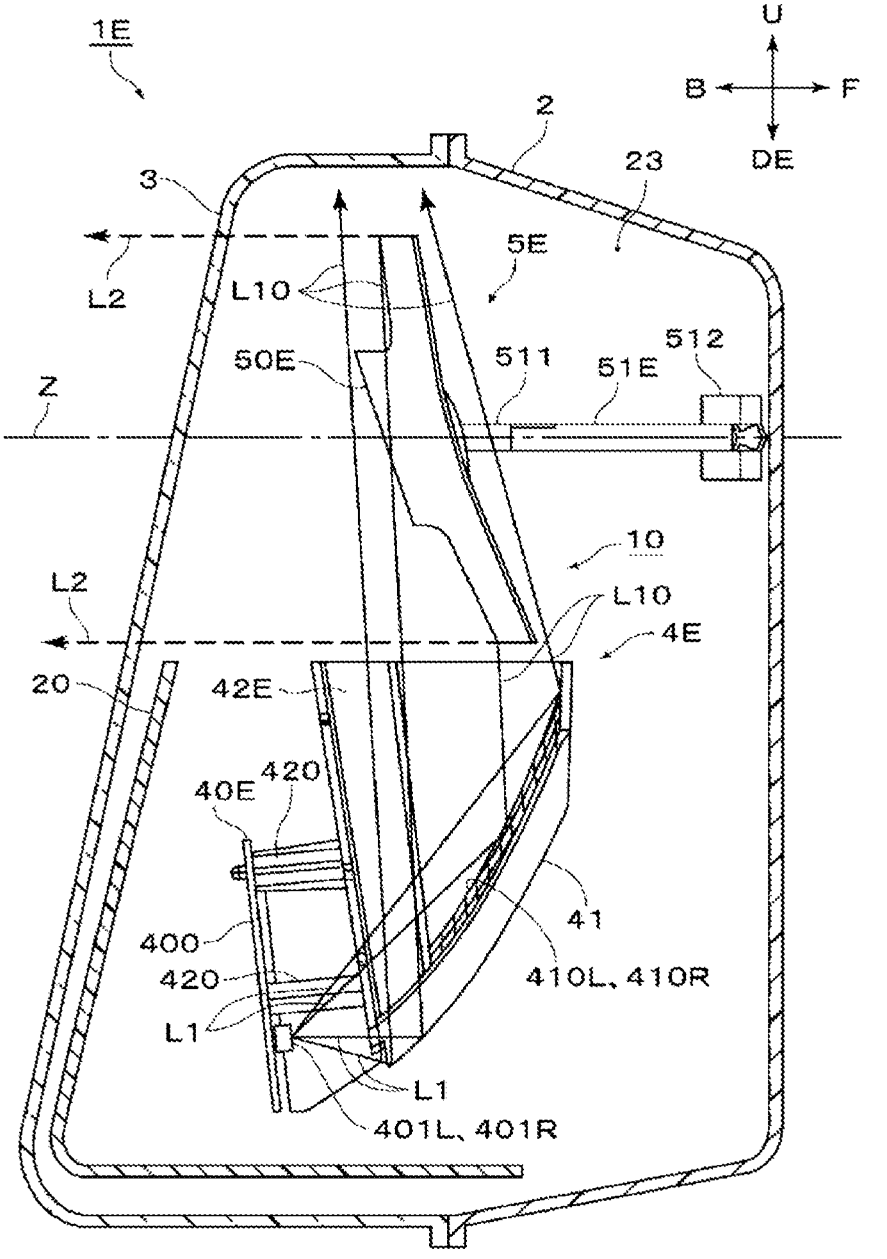
FIG. 14 is a longitudinal sectional view of a vehicle lamp illustrating main constituent components (XIV-XIV line sectional view in FIG. 12 and XIV-XIV line sectional view in FIG. 13).

In FIGS. 12 to 14, reference numeral 1E denotes a vehicle lamp according to this Embodiment 5. The vehicle lamp 1E is, in this example, as described above, and is a tail lamp that constitutes a rear combination lamp.

The vehicle lamp 1E is mounted on both left and right sides on a rear part of a vehicle (not shown), respectively. The light distribution of the tail lamp of the vehicle lamp 1E has a predetermined angular light-distribution range (irradiation range) in the left-right direction and the up-down direction with respect to a reference axis Z (see FIGS. 14 to 16). The reference axis Z is parallel to a traveling direction of the vehicle (front-back direction of the vehicle).

The vehicle lamp 1E has the lamp housing 2, an inner panel (inner housing) 20, the lamp lens 3, and a light emitting device 10 of the vehicle lamp according to this Embodiment 5 (hereinafter simply referred to as "light emitting device 10").

Explanation of Lamp Housing 2

The lamp housing 2 is as described above and is constituted by a non-transmissive member (such as a resin member). The lamp housing 2 is black in this example. An inner surface of the lamp housing 2 (surface facing the lamp chamber 23) only needs to be black. The lamp housing 2 may be in a color other than black.

Explanation of Lamp Lens 3

The lamp lens 3 is as described above and is constituted by a light-transmissive resin member such as PMMA and PC. The lamp lens 3 is a transparent outer cover, an outer lens or the like. The lamp lens 3 is constituted by a red lens in this example. The lamp lens 3 may be constituted by a colorless lens other than a red lens or a yellow-orange lens. The lamp lens 3 is attached to the lamp housing 2. As a result, the lamp housing 2 and the lamp lens 3 form the lamp chamber 23 as shown in FIGS. 12 to 14.

Explanation of Inner Panel 20

The inner panel 20 is disposed in a part from the center to a lower side of the lamp chamber 23, along the lamp lens 3.

The inner panel 20 is disposed between the lamp lens 3 and an excitation-light irradiation unit 4E, described below, of the light emitting device 10. The inner panel 20 is attached to the lamp housing 2 side via a mounting member (not shown).

The inner panel 20 is constituted by a non-transmissive material (such as a resin member). The inner panel 20 is black in this example, similarly to the lamp housing 2. A surface of the inner panel 20, that is, an outer surface (facing the lamp lens 3) and an inner surface (facing the lamp chamber 23) only need to be black. The inner panel 20 may be in a color other than black, or at least either one of the outer surface and the inner surface may be in another color other than black, or metal deposition may be applied.

Explanation of Light Emitting Device 10

Figure 15:
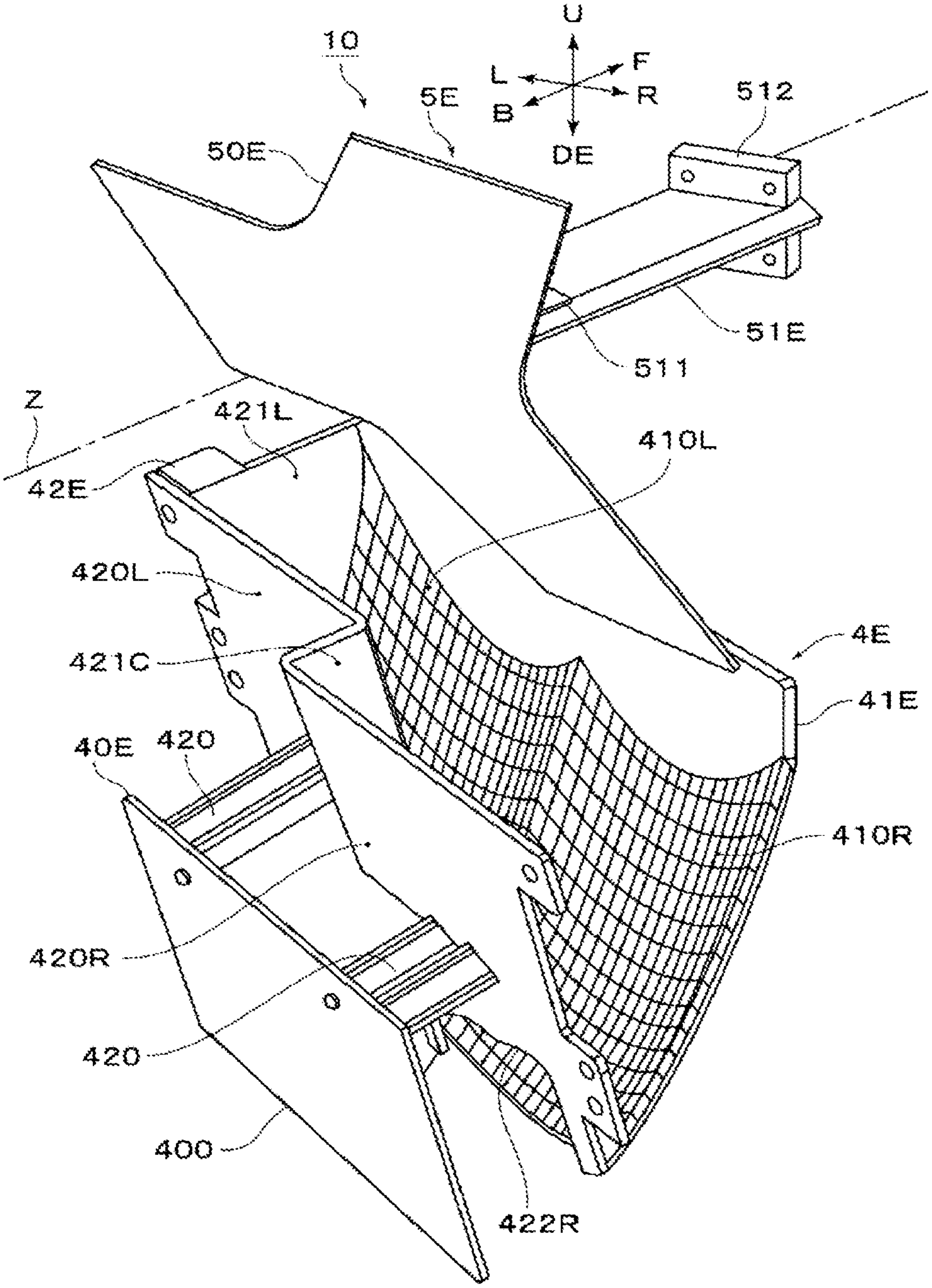
FIG. 15 is a perspective view illustrating a part of a light emitting device of the vehicle lamp.
Figure 16:
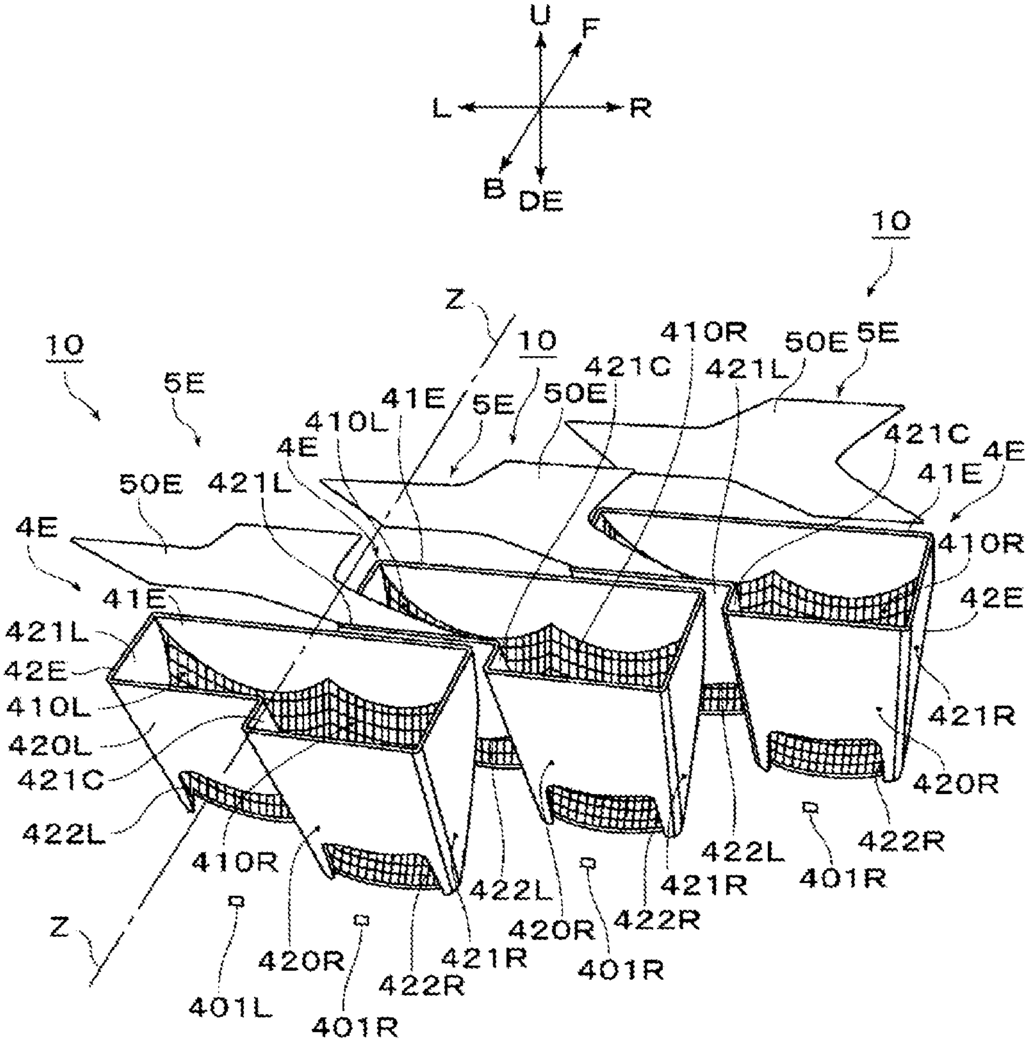
FIG. 16 is a schematic perspective view illustrating the light emitting device of the vehicle lamp.

The light emitting device 10 is disposed in the lamp chamber 23 in three sets on the left and right as shown in FIG. 16 in this example. The three sets of the light emitting devices 10 include the excitation-light irradiation unit 4E and the light conversion unit 5E, respectively, as shown in FIGS. 14 to 16.

Explanation of Excitation-Light Irradiation Unit 4E

The excitation-light irradiation unit 4E is disposed on a part from the center to the lower part of the lamp chamber 23 as shown in FIG. 14 in this example. The excitation-light irradiation unit 4E is attached to the lamp housing 2 side via the mounting member (not shown). The inner panel 20 is disposed between the excitation-light irradiation unit 4E and the lamp lens 3 as described above.

The excitation-light irradiation unit 4E has an excitation light source 40E, a reflector member 41E as an excitation-light control member, and a bracket 42E, as shown in FIGS. 14 to 16. The excitation light source 40E and the reflector member 41E are mounted on the bracket 42E, respectively. The excitation light source 40E is disposed on the lamp lens 3 side. The reflector member 41E is disposed on the lamp housing 2 side. The bracket 42E is disposed between the excitation light source 40E and the reflector member 41E. The bracket 42E is attached to the lamp housing 2 side via the mounting member (not shown). As a result, the excitation-light irradiation unit 4E is attached to the lamp housing 2 side.

Explanation of Excitation Light Source 40E

The excitation light source 40E has one substrate 400 and light emitting elements 401L and 401R on the left and right, as shown in FIGS. 14 to 16. The substrate 400 is attached to the bracket 42E via a mounting boss 420.

The light emitting elements 401L and 401R are mounted on a rear surface of the substrate 400 at two locations on the left and right of the surface facing the lamp housing 2. The light emitting elements 401L and 401R are blue LEDs, in this example, using a blue LED with a dominant wavelength of 450 nm. The left and right light emitting elements 401L and 401R are constituted by one or a plurality of blue LEDs. As the light emitting elements 401L and 401R, those other than the blue LEDs, for example, LDs (semiconductor lasers) or the like may be used.

The excitation light source 40E emits the excitation light L1 from the light emitting elements 401L, 401R (see solid-line arrows in FIG. 14). The excitation light L1 emitted from the light emitting elements 401L, 401R of the blue LED is the blue light with the dominant wavelength of 450 nm. The excitation light L1 may be violet light or ultraviolet light with a wavelength shorter than that of the blue light.

Explanation of Reflector Member 41E

As shown in FIGS. 14 to 16, the front surface of the reflector member 41E, facing the lamp lens 3, has left and right reflection surfaces 410L and 410R formed. The left and right reflection surfaces 410L and 410R face the left and right light emitting elements 401L and 401R.

Each of the left and right reflection surfaces 410L and 410R has a plurality of segments divided vertically and horizontally. The plurality of segments of the left and right reflection surfaces 410L and 410R are disposed on a parabola with the left and right light emitting elements 401L and 401R as focal points in the longitudinal section (vertical section, section in the up-down direction), and in the cross section (horizontal section, section in the left-right direction), are disposed on a convex curve with the center projecting toward the lamp lens 3 side (rear side) and lowering toward the lamp housing 2 side (front side) as it goes to the both left-right sides.

The plurality of segments of the left and right reflection surfaces 410L and 410R reflect the excitation light L1 emitted from the left and right light emitting elements 401L and 401R, respectively, as excitation reflected light L10 (see solid-line arrows in FIG. 14) in a predetermined direction. As a result, the excitation reflected light L10 is controlled to a predetermined light distribution DL and is emitted to the light conversion unit 5E side.

The predetermined light distribution DL has a light distribution range (irradiation range of the excitation reflected light L10) that encompasses, at least narrowly, the light emitting film 51 of a light emitting panel 50E described below of the light conversion unit 5E, as shown in the substantially rectangular shape in FIG. 18. The predetermined light distribution DL has a uniform light intensity (illuminance) over the light distribution range. The predetermined light distribution DL may have a difference between high and low in the light intensity (illuminance) within the light distribution range. In other words, the intensity of light within the light emission range may vary continuously.

Explanation of Bracket 42E

The bracket 42E is disposed between the excitation light source 40E and the reflector member 41E as shown in FIGS. 14 to 16. The bracket 42E has a left-front plate portion 420L, a right-front plate portion 420R, a left-side plate portion 421L, a right-side plate portion 421R, and an intermediate-side plate portion 421C.

The left-front plate portion 420L faces the left reflection surface 410L. The right-front plate portion 420R faces the right reflection surface 410R and the substrate 400 of the excitation light source 40E, respectively. On the right-front plate portion 420R, the substrate 400 is mounted via the mounting boss 420, as described above.

The left-side plate portion 421L is bent from the left side of the left-front plate portion 420L and is connected to the left side of the left reflection surface 410L. The right-side plate portion 421R is bent from the right side of the right-front plate portion 420R and is connected to the right side of the right reflection surface 410R. The intermediate-side plate portion 421C is bent from the right side of the left-front plate portion 420L and is also bent from the left side of the right-front plate portion 420R. As a result, the left-front plate portion 420L and the right-front plate portion 420R are disposed alternately front and back through the intermediate-side plate portion 421C.

A left window portion 422L and a right window portion 422R are provided at the center of a lower edge part of the left-front plate portion 420L and the center of a lower edge part of the right-front plate portion 420R, respectively. As a result, the excitation light L1 emitted from the left and right light emitting elements 401L and 401R passes through the left window portion 422L and the right window portion 422R and enters the left and right reflection surfaces 410L and 410R.

Explanation of Light Conversion Unit 5E

The light conversion unit 5E has the light emitting panel 50E and a stay 51E as a disposition member, as shown in FIGS. 13 to 16. The light conversion unit 5E is, in this example, disposed on a part from the center to the upper side of the lamp chamber 23, that is, on the upper side with respect to the excitation-light irradiation unit 4E.

Explanation of Light Emitting Panel 50E The light emitting panel 50E emits the secondary light L2 (see solid-line arrows in FIG. 14) by the excitation reflected light L10 emitted from the reflector member 41E and emits surface light over the whole surface in this example, as shown in a slanted lattice hatched area in FIG. 13. The light emitting panel 50E is similar to the light conversion unit 5 of Embodiment 1 described above and has the substrate (support substrate) 50, the light emitting film (light emitting layer) 51, the secondary-light emitting surface 52, the reflection film (reflection layer) 53, the reflection surface 54, and the sealing materials 55 and 56 as shown in FIGS. 2 and 3 described above.

The substrate 50 is as described above and transmits the excitation reflected light L10 and the secondary light L2 described below. The substrate 50 has a plate shape of the shape shown in FIGS. 13 to 16. The substrate 50 may have a rectangular, square, or any other shape other than the plate shapes shown in FIGS. 13 to 16. For the substrate 50 is, in this example, glass is used.

The light emitting film 51 is as described above and emits the secondary light L2 (see a dashed arrow in FIG. 14) in all directions by the excitation reflected light L10 emitted from the reflector member 41E of the excitation-light irradiation unit 4E. As a result, the light emitting film 51 emits surface light over the whole surface in this example, as shown in the slanted lattice hatched area in FIG. 13. Here, the intensity of the secondary light L2 can be adjusted by a film thickness of the light emitting film 51. In other words, if the thickness of the light emitting film 51 is made thicker, the secondary light L2 can be adjusted to be stronger, while conversely, if the thickness of the light emitting film 51 is made thinner, the secondary light L2 can be adjusted to be weaker.

The light emitting film 51 is formed with an arbitrary design, and in this example, it is formed having a shape one size smaller than the shape of the substrate 50 as shown in FIGS. 13 to 16. As a result, the light emitting film 51 forms a light emitting surface of an arbitrary design, as shown in the slanted lattice hatched area in FIG. 13. The secondary light L2 is as described above and is red light in this example.

Explanation of Light Emitting Design of Light Emitting Panel 50E The light emitting design of the light emitting panel 50E can be changed as desired by changing the design (pattern, shape, graphics, outline and the like) of the light emitting film 51 as desired.

Figure 17:
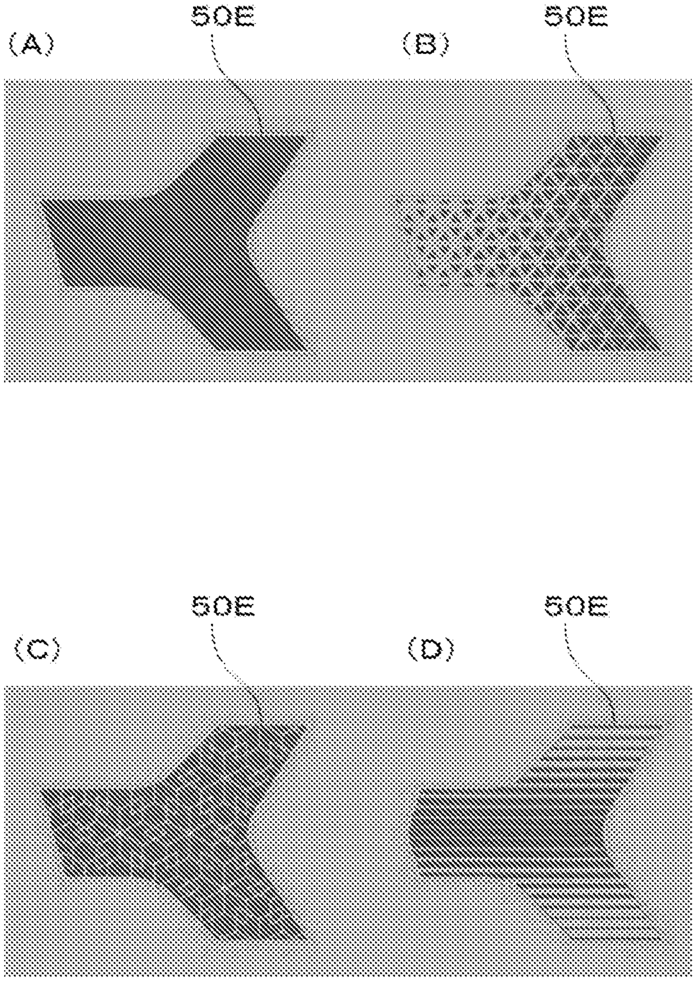
FIG. 17 are explanatory views illustrating light emission designs of the light emitting panel, which are different light emission patterns in the same light emission shape.

For example, the light emitting panel 50E can form different light emitting patterns in the same light emitting shape, as shown in FIGS. 13 to 16 and FIGS. 17(A), 17(B), 17(C), 17(D). FIG. 17(A) is a whole-surface light emitting pattern. FIG. 17(B) is a Kagome pattern (wickerwork pattern). FIG. 17(C) is an Asanoha pattern (hemp leaf pattern). FIG. 17(D) is a horizontal stripe pattern (a horizontal stripe pattern with a large vertical width of the horizontal strips at the center and vertical widths of the horizontal stripes gradually decreasing as it goes up and down). FIG. 17 is illustrated in grayscale, and areas indicated in dark gray are the light emission spots.

Figure 18:
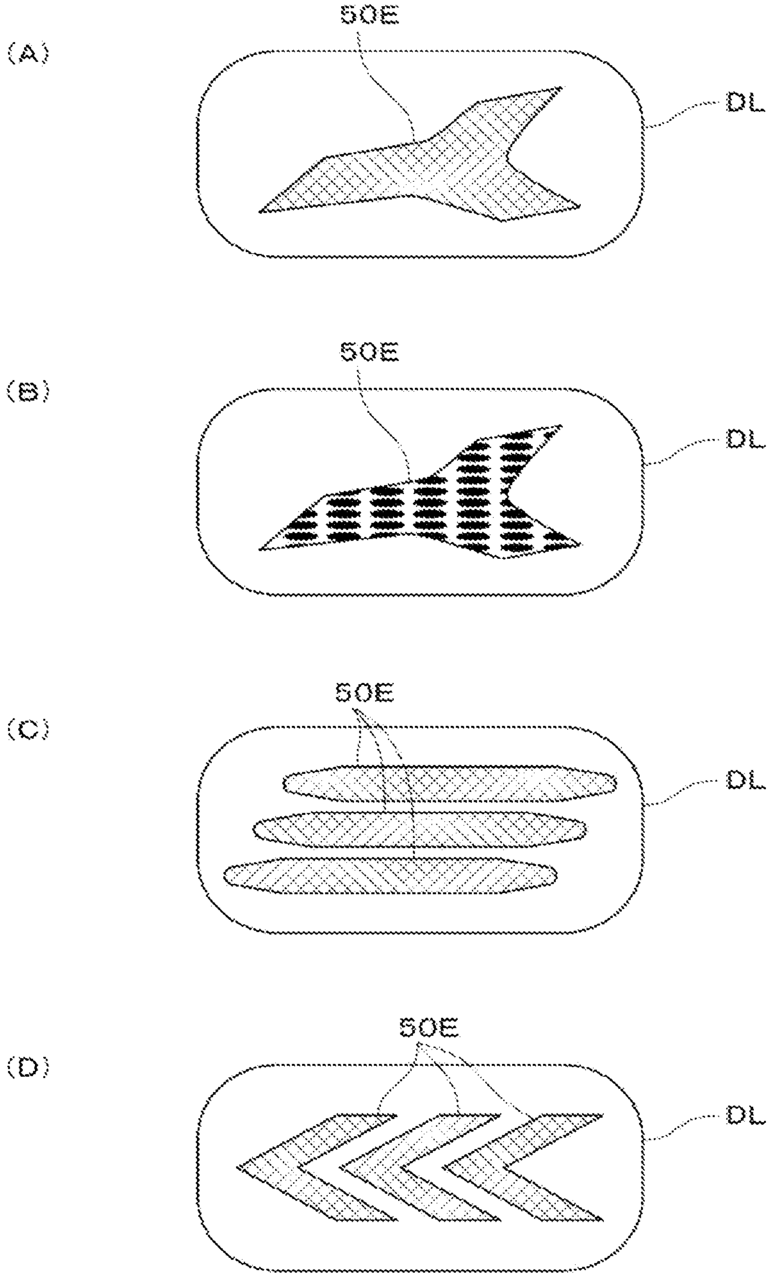
FIG. 18 are explanatory views illustrating the light emission designs of light emitting panels disposed in predetermined light distribution, which are different light emission patterns and different light emission shapes.

The light emitting panel 50E can form different light emitting designs (light emitting shapes and light emitting patterns) in the predetermined light distribution DL as shown in FIGS. 18(A), 18(B), 18(C), 18(D). In FIGS. 18(A) and 18(B), in the same light emitting shape, FIG. 18(A) shows the whole-surface light emitting pattern and FIG. 18(B) shows a light emitting pattern of a laterally long rod group. FIG. 18(C) shows three vertical pieces of laterally-long light emitting designs. FIG. 18(D) shows three horizontal pieces of laterally V-shaped light emitting designs. In FIG. 18, the light within the predetermined light distribution DL is the blue color of the excitation reflected light L10, and the area with the slanted lattice hatching (black in FIG. 18(B)) is the red color of the secondary light L2.

FIGS. 17 and 18 described above are exemplification of some of the light emitting designs of the light emitting panels 50E, and there is no limit to the number of light emitting designs of the light emitting panels 50E.

Explanation of Stay 51E, First Mounting Member 511 and Second Mounting Member 512

The stay 51E has a square bar shape, which is flat to right and left, as shown in FIGS. 14 and 15. At one end of the stay 51E, the light emitting panel 50E is mounted via the first mounting member 511. The other end of the stay 51E is mounted on the lamp housing 2 via the second mounting member 512.

At least either one of the first mounting member 511 and the second mounting member 512 has a removable structure. The first mounting member 511 and the second mounting members 512 are constituted by bolts and nuts, magnets, screws, a fitting type and the like, for example.

The stay 51E causes the light emitting panel 50E to be disposed with a predetermined attitude within the light distribution DL. In other words, the stay 51E causes a surface of the light emitting panel 50E, that is, the light emitting surface of the light emitting film 51 to be inclined toward an irradiation direction of the excitation reflected light L10 from the reflector member 41E and to face the lamp lens 3. In this example, the substrate 50 of the light emitting panel 50E faces the lamp lens 3. The sealing materials 55 and 56 of the light emitting panel 50E are removably attached to the stay 51E via the first mounting member 511.

The stay 51E, the first mounting member 511, and the second mounting member 512 are black in this example similarly to the lamp housing 2. The surfaces of the stay 51E, the first mounting member 511 and the second mounting member 512 (the surfaces facing the lamp chamber 23) only need to be black. The stay 51E, the first mounting member 511, and the second mounting member 512 may be in a color other than black.

Explanation of Actions of Embodiment 5

The vehicle lamp 1E according to this Embodiment 5 has a configuration as described above, and actions thereof will be described below.

First, when the left and right light emitting elements 401L and 401R of the excitation light source 40E in the excitation-light irradiation unit 4E are in the off state, the light emitting panel 50E is in a non light-emitting state. Therefore, when the inside of the lamp chamber 23 is viewed from the lamp lens 3, as shown in FIG. 12, the light emitting panel 50E, which is in the non light-emitting state, is not conspicuous and only the black color of the lamp housing 2, the stay 51E, the first mounting member 511, and the second mounting member 512 is visible. In FIG. 12, the black color of the lamp housing 2, the stay 51E, the first mounting member 511, and the second mounting member 512 is shown without color.

Then, the left and right light emitting elements 401L and 401R of the excitation light source 40E in the excitation-light irradiation unit 4E are turned on. Then, the excitation light L1 (blue light) is emitted from the left and right light emitting elements 401L and 401R. The excitation light L1 is reflected at the plurality of segments of the left and right reflection surfaces 410L and 410R of the reflector member 41E of the excitation-light irradiation unit 4E to a predetermined direction as the excitation reflected light L10. The excitation reflected light L10 is controlled to the predetermined light distribution DL and emitted to the light conversion unit 5E side.

The light emitting film 51 of the light emitting panel 50E in the light conversion unit 5E emits the secondary light L2 (red light) in all directions by emitting the excitation reflected light L10 controlled to the predetermined light distribution DL.

A part of the secondary light L2 passes through the light emitting film 51 and is reflected by the reflection surface 54 to the light emitting film 51 side. The reflected secondary light L2 passes through the light emitting film 51 again and is emitted from the secondary-light emitting surface 52 to the lamp lens 3 side. The remainder of the secondary light L2 is not reflected by the reflection surface 54 but is emitted from the secondary-light emitting surface 52 to the lamp lens 3 side.

The excitation reflected light L10 that passed through the light emitting film 51 and reached the reflection surface 54 is reflected at the reflection surface 54 to the light emitting film 51 side and excites the secondary light L2 in the light emitting film 51. The secondary light L2 excited by the excitation reflected light L10 is emitted from the light emitting film 51 and is emitted from the secondary-light emitting surface 52 to the lamp lens 3 side.

The secondary light L2 emitted from the secondary-light emitting surface 52 to the lamp lens 3 side is transmitted through the substrate 50, passes through the lamp chamber 23, is transmitted through the lamp lens 3, and is emitted to an outside of the vehicle lamp 1E in a predetermined light distribution pattern of the tail lamp. At this time, the light emitting film 51 emits surface light to form light emitting surfaces as shown in FIGS. 13, 17, and 18.

As a result, regarding the vehicle lamp 1E, the light emitting surface of the light emitting film 51 can be visually recognized on an upper half of an inside of the lamp chamber 23 through the lamp lens 3 as shown in FIG. 13. In the lower half of the inside of the lamp chamber 23, the black color (or a color other than black) of the inner panel 20 is visible.

Explanation of Effects of Embodiment 5

The vehicle lamp 1E and the light emitting device 10 of the vehicle lamp 1E (hereinafter referred to as the "vehicle lamp 1E and the light emitting device 10") according to this Embodiment 5 have the configuration and the actions as described above, and effects thereof will be described below.

The vehicle lamp 1E and the light emitting device 10 according to this Embodiment 5 include the excitation light source 40E that emits the excitation light L1, the reflector member 41E as the excitation-light control member that controls the excitation light L1 emitted from the excitation light source 40E to the predetermined light distribution DL and emits it, the light emitting panel 50E that emits the secondary light L2 by the excitation reflected light L10 emitted from the reflector member 41E and emits light, and the stay 51E as a disposition member that disposes the light emitting panel 50E in the light distribution DL.

As a result, the vehicle lamp 1E and the light emitting device 10 according to this Embodiment 5 can efficiently emit the excitation light L1 from the excitation light source 40E of the excitation-light irradiation unit 4E to the light conversion unit 5E as the excitation reflected light L10 by an excitation-light control action of the reflector member 41E.

The vehicle lamp 1E and the light emitting device 10 according to this Embodiment 5 have at least either one of the first mounting member 511 for interchangeably mounting the light emitting panel 50E on the excitation light source and the reflector member 41E of the excitation-light irradiation unit 4E and the stay 51E and the second mounting member 512 for interchangeably mounting the light emitting panel 50E and the stay 51E of the light conversion unit 5E on the excitation light source 40E and the reflector member 41E of the excitation-light irradiation unit 4E.

As a result, the vehicle lamp 1E and the light emitting device 10 according to this Embodiment 5 is capable of replacing the light emitting panel 50E by the first mounting member 511, which has a removable structure, or is capable of replacing the light emitting panel 50E and the stay 51E by the second mounting member 512, which has a removable structure. As a result, the vehicle lamp 1E and the light emitting device according to this Embodiment 5 can easily change the light emitting design of the light emitting panel 50E and can significantly change its appearance.

The vehicle lamp 1E and the light emitting device 10 according to this Embodiment 5 is capable of replacing the light emitting panel 50E of the light conversion unit 5E by sharing the lamp housing 2, the lamp lens 3, the excitation-light irradiation unit 4E, and the stay 51E by the first mounting member 511, or is capable of replacing the light emitting panel 50E and the stay 51E of the light conversion unit 5E by sharing the lamp housing 2, the lamp lens 3 and the excitation-light irradiation unit 4E by the second mounting member 512.

As a result, the vehicle lamp 1E and the light emitting device 10 according to this Embodiment 5 can share the lamp housing 2, the lamp lens 3, and the excitation-light irradiation unit 4E, or the lamp housing 2, the lamp lens 3, the excitation-light irradiation unit 4E, and the stay 51E. As a result, the vehicle lamp 1E and the light emitting device 10 of this Embodiment 5 only need to change the light emitting panel or the light emitting panel 50E and the stay 51E in the case of a design change of the light emitting design of the light emitting panel 50E, and since there is no need to change many other components, design changes of dies for the many other components, changes of resin materials, changes of optical designs, changes of mounting spaces, changes of layouts and the like are not required, for which manufacturing costs can be lowered.

In the vehicle lamp 1E and the light emitting device 10 according to this Embodiment 5, the excitation-light control member is constituted by the reflector member 41E having the reflection surfaces 410L and 410R that control the excitation light L1 as the excitation reflected light L10. As a result, the vehicle lamp 1E and the light emitting device 10 according to this Embodiment 5 can cause the excitation light L1 to be reflected as the excitation reflected light L10 by the reflector member 41E, to be controlled to the predetermined light distribution DL, and to be efficiently emitted to the light conversion unit 5E side.

In the vehicle lamp 1E and the light emitting device 10 according to this Embodiment 5, the light emitting panel 50E has the reflection film 53. As a result, the vehicle lamp 1E and the light emitting device 10 according to this Embodiment 5 can cause the secondary light L2 emitted by the excitation reflected light L10 to be reflected by the reflection film 53 to the lamp lens 3 side. Thus, the vehicle lamp 1E and the light emitting device 10 according to this Embodiment 5 can cause the secondary light L2 to be efficiently emitted to the outside of the vehicle lamp 1E through the lamp lens 3.

In the vehicle lamp 1E and the light emitting device 10 according to this Embodiment 5, the light emitting panel 50E has the substrate 50, the light emitting film 51, the secondary-light emitting surface 52, the reflection film 53, the reflection surface 54, and the sealing materials 55 and 56. As a result, in the vehicle lamp 1E and the light emitting device 10 according to this Embodiment 5, electrical system components such as wiring and connectors are no longer necessary in the light emitting panel 50E, which results in a thin and light-weighted light emitting panel 50E. Moreover, the thin and light-weighted light emitting panel 50E can be made inconspicuous, as if there is nothing around it.

In addition, in the vehicle lamp 1E and the light emitting device 10 according to this embodiment 5, in the stay 51E (including the first mounting member 511 and the second mounting member 512) on which the light emitting panel 50E is disposed within the predetermined light distribution DL, too, the electrical system components such as wiring and connectors are no longer necessary, which results in the thin and light-weighted stay 51E. Moreover, the thin and light-weighted stay 51E can be made inconspicuous, as if there is nothing around it.

In the vehicle lamp 1E according to this Embodiment 5, at least the surface of the lamp housing 2 facing the lamp chamber 23 is black and thus, the light emitting panel 50E and the stay 51E (including the first mounting member 511 and the second mounting member 512) in the lamp chamber 23 become inconspicuous by the black color in the lamp chamber 23. As a result, regarding the vehicle lamp 1E according to this Embodiment 5, when the inside of the lamp chamber 23 is viewed through the lamp lens 3 in a state where the light emitting elements 401L and 401R are off, the light emitting panel 50E and the stay 51E are not conspicuous, the inside of the black lamp chamber 23 can be seen, and the inside of the lamp chamber 23 can be made substantially invisible.

On the other hand, in the vehicle lamp 1E according to this Embodiment 5, when the light emitting elements 401L and 401R are turned on, the inconspicuous light emitting panel 50E emits light and becomes a conspicuous presence. As a result, the vehicle lamp 1E according to this Embodiment 5 can embody and show a substantially invisible phenomenon in the black lamp chamber 23 and a light emitting phenomenon of the light emitting panel 50E in the black lamp chamber 23.

The vehicle lamp 1E according to this Embodiment 5 has the inner panel 20 disposed between the lamp lens 3 and the excitation-light irradiation unit 4E and thus, when the inside of the lamp chamber 23 is viewed through the lamp lens 3, the excitation-light irradiation unit 4E is concealed by the inner panel 20, and the appearance of the lamp chamber 23 is improved.

In the vehicle lamp 1E according to this Embodiment 5, at least the surface of the lamp housing 2 facing the lamp chamber 23, the surface of the stay 51E (including the first mounting member 511 and the second mounting member 512), and the surface of the inner panel 20 are black and thus, the inside of the lamp chamber 23 can be made more invisible.

The vehicle lamp 1E according to this Embodiment 5 has three sets of the light emitting devices 10 disposed on the left and right in the lamp chamber 23. As a result, the vehicle lamp 1E according to this Embodiment 5 can form a light emission design of the light emitting panel 50E, which is long in the left and right, by the three sets of light emitting devices 10.

The vehicle lamp 1E according to this Embodiment 5 can form a light emission design which is lengthy in left and right, up and down or diagonally or a light emission design within a range which is wide in left and right, up and down or diagonally by disposing a plurality of sets of the light emitting devices 10 in the lamp chamber 23 arbitrarily in left, right, up and down.

Explanation of Variation of Excitation-Light Control Member

Figure 19:
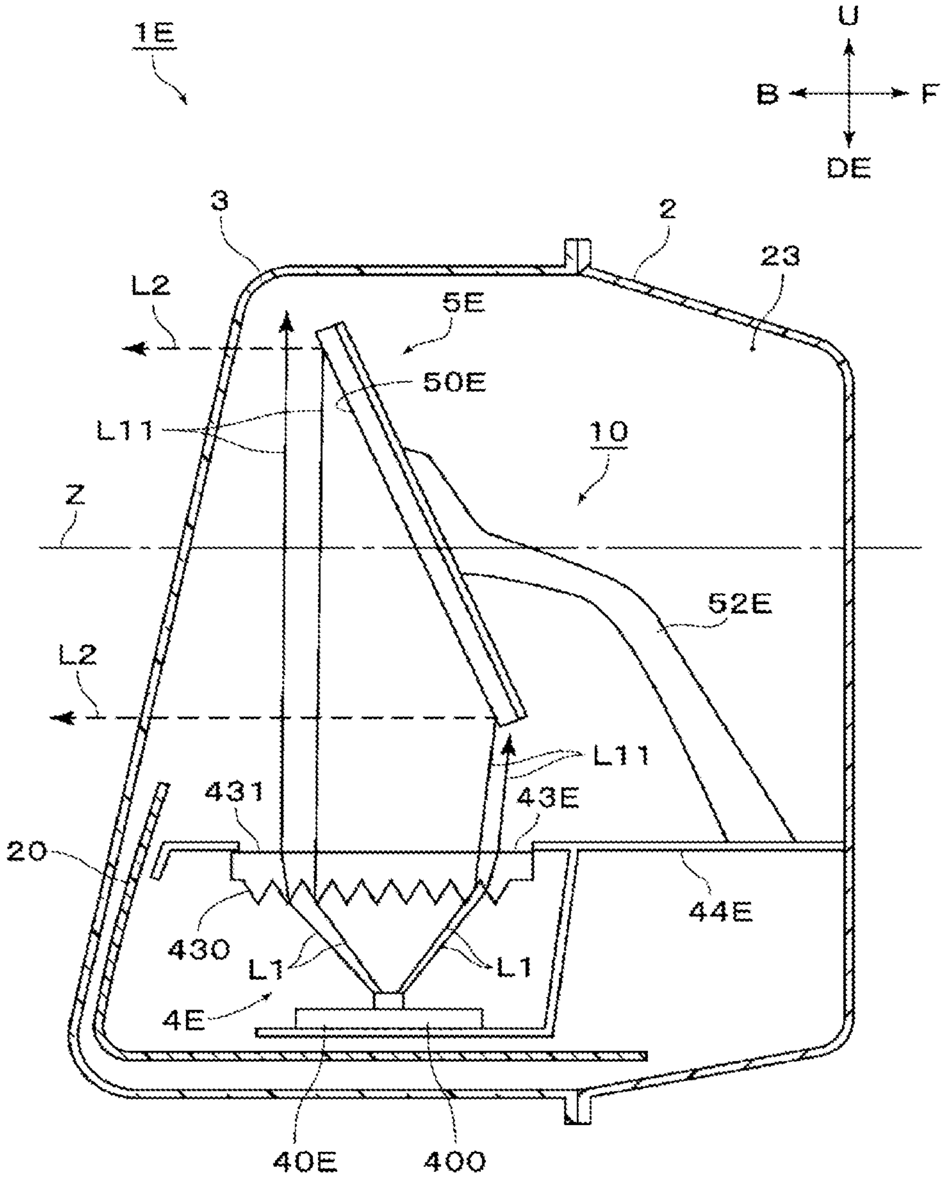
FIG. 19 is a longitudinal sectional view (sectional view corresponding to FIG. 14) illustrating a variation of an excitation-light control member of the light emitting device of the vehicle lamp.

FIG. 19 shows a variation of the excitation-light control member of the light emitting device of the vehicle lamp. In FIG. 19, the same reference numerals as those in FIGS. 12 to 18 indicate the same items.

The excitation-light control member in FIGS. 12 to 18 described above is the reflector member 41E having the reflection surfaces 410L and 410R which control the excitation light L1 from the excitation light source 40E. The excitation-light control member of this variation 1 is an inner lens member 43E. The inner lens member 43E has an incident surface 430 and an emitting surface 431 that control the excitation light L1 from the excitation light source 40E.

The incident surface 430 has a plurality of prismatic surfaces (refractive surfaces) in this example. The emitting surface 431 is, in this example, a flat surface. The incident surface 430 and the emitting surface 431 cause the excitation light L1 emitted from the excitation light source 40E to be emitted as an excitation outgoing light L11 in a predetermined direction. As a result, the excitation outgoing light L11 is controlled to the predetermined light distribution DL and is emitted to the light conversion unit 5E side.

The inner lens member 43E, which is a variation of the excitation-light control member, is constituted as described above and thus, it can achieve the same effect as that of the reflector member 41E described above.

In FIG. 14 described above, the substrate 400 of the excitation light source 40E is disposed in the vertical direction (up-down direction), the stay 51E has a square bar shape in the horizontal direction (left-right direction), and the excitation light source 40E and the reflector member 41E are attached to the bracket 42E. On the other hand, in this FIG. 19, the substrate 400 of the excitation light source 40E is disposed in the horizontal direction (left-right direction), a stay 52E is L-shaped, and the excitation light source 40E, the inner lens member 43E, and the stay 52E are attached to the bracket 44E.

In this variation, a prismatic surface is provided on the incident surface 430, but instead of the prismatic surface, emboss processing may be provided, or a group of light diffusing elements (ink or paint) may be included in the inner lens member 43E. The prismatic surface or the emboss processing may be provided on the emitting surface 431 or may be provided on the incident surface 430 and the emitting surface 431.

Explanation of Variation of Excitation-Light Control Member

Figure 20:
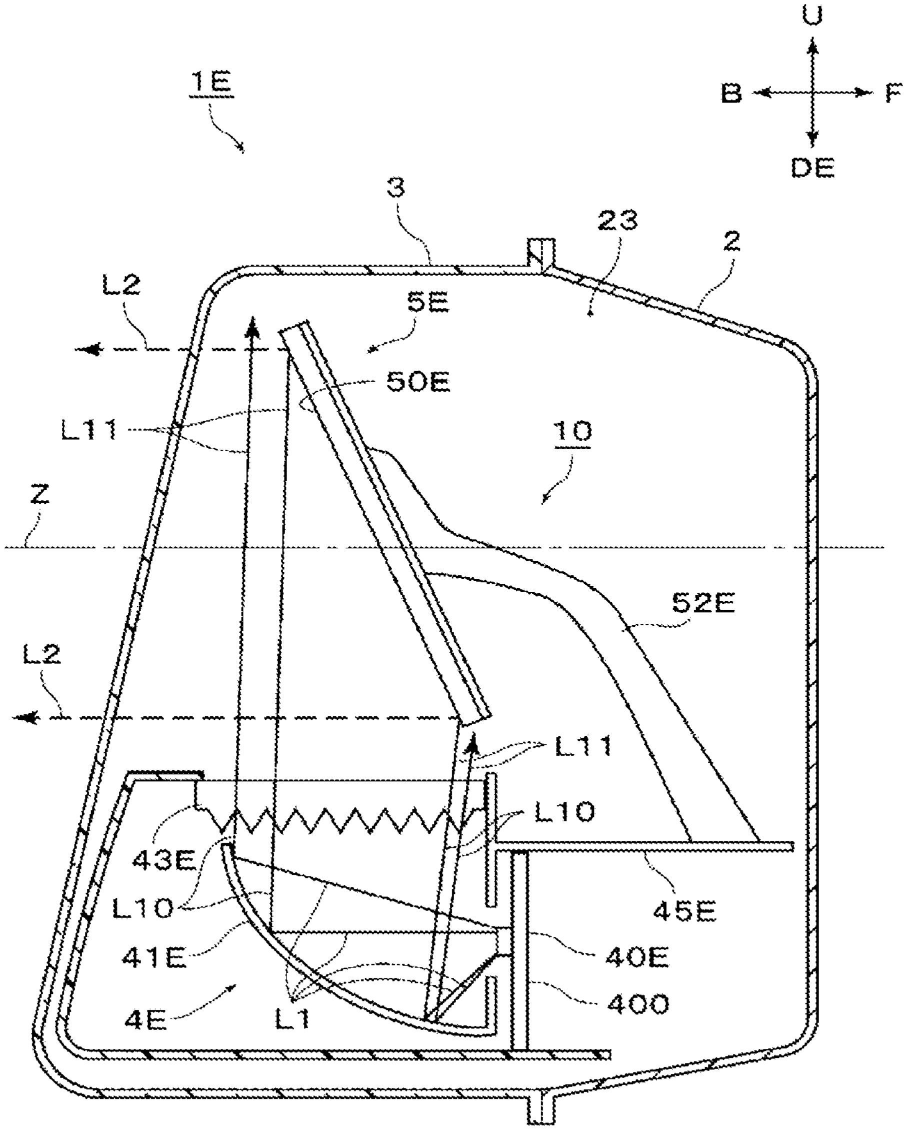
FIG. 20 is a longitudinal sectional view (sectional view corresponding to FIG. 14, FIG. 19) illustrating a variation of the excitation-light control member of the light emitting device of the vehicle lamp.

FIG. 20 shows a variation of the excitation-light control member of the light emitting device of the vehicle lamp. In FIG. 20, the same reference numerals as those in FIGS. 12 to 19 indicate the same items.

The excitation-light control member in FIGS. 12 to 18 described above is the reflector member 41E having the reflection surfaces 410L and 410R which control the excitation light L1 from the excitation light source 40E. The excitation-light control member in FIG. 19 described above is the inner lens member 43E having the incident surface 430 and the emitting surface 431 which control the excitation light L1 from the excitation light source 40E.

On the other hand, the excitation-light control member in this variation is a combination of the reflector member 41E in FIGS. 12 to 18 described above and the inner lens member 43E in FIG. 19 described above.

Since the excitation-light control member in this variation has the configuration as above, it can achieve the same working effects as those of the reflector member 41E in FIGS. 12 to 18 described above and the inner lens member 43E in FIG. 19 described above.

In FIG. 14 described above, the excitation light source 40E is disposed on the lamp lens 3 side, the reflector member 41E is disposed on the lamp housing 2 side, and the excitation light source 40E and the reflector member 41E are mounted on the bracket 42E. In FIG. 19 described above, the excitation light source 40E, the inner lens member 43E, and the stay 52E are mounted on the bracket 44E.

On the other hand, in this FIG. 20, the excitation light source 40E is disposed on the lamp housing 2 side, the reflector member 41E is disposed on the lamp lens 3 side, and the excitation light source 40E, the reflector member 41E, the inner lens member 43E and the stay 52E are mounted on the bracket 45E.

Explanation of Variation of Light Conversion Unit 53E

Figure 21:
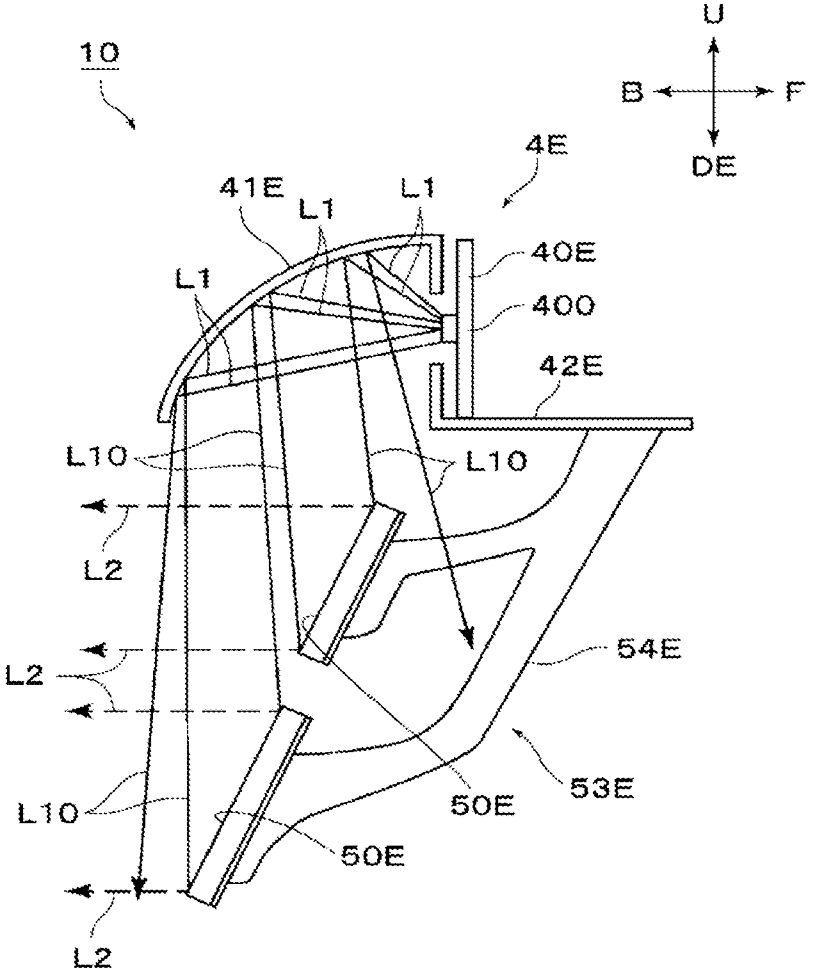
FIG. 21 is a longitudinal sectional view (sectional view corresponding to FIG. 14, FIG. 19, FIG. 20) illustrating a variation of the light conversion unit of the light emitting device of the vehicle lamp.

FIG. 21 shows a variation of a light conversion unit 53E of the light emitting device of a vehicle lamp. In FIG. 21, the same reference numerals as those in FIGS. 12 to 20 indicate the same items.

The light conversion unit 5E in FIGS. 12 to 20 described above has a single light emitting panel 50E in which one end of the stay 51E having a square bar-shape and one end of the stay 52E having an L-shape are not separated. On the other hand, the light conversion unit 53E in this variation has a plurality of (in this case, two) upper and lower light emitting panels 50E, and one end of a stay 54E is separated into a plurality (in this case, bifurcated) up and down. As a result, the light conversion unit 53E in this variation is suitable for forming a light emission design with three up-to-down laterally-long stripes, as shown in FIG. 18(C).

The light conversion unit 53E in this variation is also suitable for forming a light emission design with three left-to-right laterally V-shaped patterns, as shown in FIG. 18(D), by disposing the plurality of light emitting panels 50E left and right and by separating one end of the stay 54E into plural left and right pieces.

Furthermore, since the light conversion unit 53E in this variation is constituted by the configuration as described above, it can achieve the same effects as those of the light conversion unit 5E described above.

In FIG. 14 described above, the light conversion unit 5E is disposed on the upper side with respect to the excitation-light irradiation unit 4E. On the other hand, in this FIG. 21, the light conversion unit 53E is disposed on the lower side with respect to the excitation-light irradiation unit 4E.

Explanation of Variation of Light Emitting Panel 50A

Figure 22:
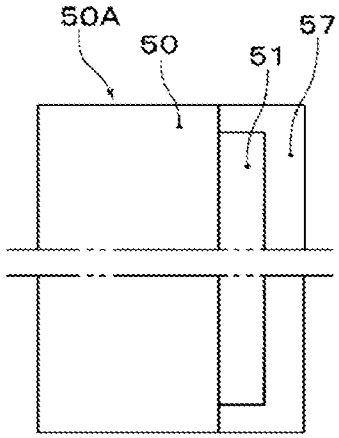
FIG. 22 illustrate a variation of a light emitting panel of the light emitting device of the vehicle lamp.
Figure 22:
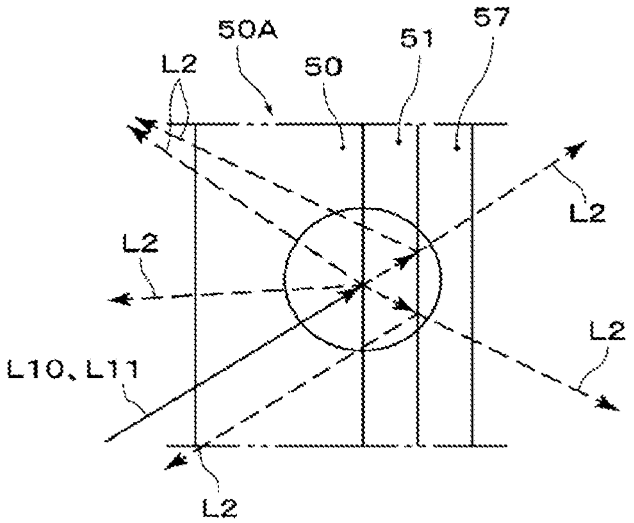

FIG. 22 shows a variation of the light emitting panel 50A of the light emitting device of the vehicle lamp. In FIG. 22, the same reference numerals as those in FIGS. 12 to 21 indicate the same items.

The light emitting panel 50E described above has the reflection film 53. On the other hand, the light emitting panel 50A in this variation does not have the reflection film 53. In other words, the light emitting panel 50A in this variation has the substrate 50, the light emitting film 51, and a sealing material 57 (such as light-transmissive aluminum oxide ($Al_2O_3$)).

The light emitting panel 50A of this variation can achieve substantially the same effects as those of the light emitting panel 50E described above. In particular, since the light emitting panel 50A in this variation is constituted by a light-transmissive member, when the light emitting elements 401L and 401R are off, they are transparent and invisible (invisible state) when the inside of the lamp chamber 23 is viewed from the lamp lens 3, as shown in FIG. 12.

Furthermore, if at least the surfaces of the lamp housing 2 facing the lamp chamber 23, the surfaces of the stays 51E, 52E, 54E and the surfaces of the first mounting member 511 and the second mounting member 512, and the surface of the inner panel 20 are black in color, the presence of the light emitting panel 50A in this variation is even less conspicuous and can make the inside of the lamp chamber 23 invisible.

Explanation of Example other than Embodiments 1, 2, 3, 4, 5, and Variations

In the aforementioned Embodiments 1, 2, 3, 4, 5, and variations, the example in which the vehicle lamps 1A, 1B, 1B, 1C, 1D, 1E are tail lamps constituting the rear combination lamps, and the secondary light L2 is the red light R is described. However, in the present invention, the vehicle lamps 1A, 1B, 1B, 1C, 1D, 1E may be stop lamps, tail/stop lamps or turn signal lamps other than tail lamps. In the case of the stop lamps and the tail/stop lamps, the secondary light L2 is the red light R, and in the case of the turn signal lamps, the secondary light L2 is the yellow-orange light A.

In the above embodiments 1, 2, 3, 4, 5, and variations, the optical filter 6 has transmittance of 50% or more for a part of the excitation light L1 in the wavelength range of the excitation light L1 from 200 nm to 500 nm, and transmittance of 50% or less for a part of the secondary light L2 in the wavelength range of the secondary light L2 from 500 nm to 800 nm. However, in the present invention, the numerical values of the transmittance of the excitation light L1 or the numerical values of the transmittance of the secondary light L2 of the optical filter 6 are not limited.

Furthermore, in the aforementioned Embodiment 1, the light conversion unit 5 is disposed by facing downward, and the optical filter 6 and the excitation-light irradiation unit 4 are disposed on the lower side with respect to the light conversion unit 5. However, in this invention, the light conversion unit 5 may be disposed by facing a direction other than downward. In this case, the optical filter 6 and the excitation-light irradiation unit 4 are disposed in the direction in which the light conversion unit 5 is faced.

The present invention is not limited by the aforementioned Embodiments 1, 2, 3, 4, 5, and variations. For example, a shape of the surface light emission is not particularly limited. That is, the secondary-light emitting surface 52 has a rectangular, square or free-form planar shape, but it may also be a curved surface. As described above, the surface light emission of any design shape can be obtained.

In the aforementioned Embodiment 5 and variations, the reflector member 41E, the inner lens member 43E, the reflector member 41E and the inner lens member 43E are combined as the excitation-light control members. However, in the present invention, light-guiding members (light guide plates, light guide rods) other than the members described above and having incident surfaces, emitting surfaces, and total reflection surfaces, for example, may also be acceptable as the excitation-light control members. In short, it only needs to be a member which controls the excitation light L1 from the excitation light source 40E and emits it to the light emitting panel 50E.

DESCRIPTION OF REFERENCE NUMERALS

1A, 1B, 1C, 1D Vehicle lamp
2 Lamp housing
23 Lamp chamber
3 Lamp lens
4, 4C, 4D Excitation-light irradiation unit
5 Excitation light source
41 Excitation-light final irradiation surface (reflection surface of reflector 43, emitting surface of light guide 44)
42 Emitting surface
43 Reflector (optical component)
44 Light guide (optical component)
45 Incident surface
5 Light conversion unit
50 Substrate
51 Light emitting film (light emitting layer)
52 Secondary-light emitting surface
53 Reflection film (reflection layer)
54 Reflection surface
55 Sealing material
56 Sealing material
6 Optical Filter
A Yellow-orange light
D Emission direction
I.P. Person's field of view
L1 Excitation light
L2 Secondary light
L3 External light
L4 External light
N Normal line
N1 Normal line
R Red light
W White light
θ1 Disposition angle
θ2 Disposition angle
θ3 Disposition angle
1E Vehicle lamp
10 Light emitting device
4E Excitation-light irradiation unit
40E Excitation light source
400 Substrate
401L, 401R Light emitting element
41E Reflector member
410L, 410R Reflection surface
42E Bracket
420 Mounting boss
420L Left-front plate portion
420R Right-front plate portion
421C Intermediate-side plate portion
421L Left-side plate portion
421R Right-side plate portion
422L Left window portion
422R Right window portion
43E Inner lens member
430 Incident surface
431 Emitting surface
44E Bracket
45E Bracket
5E Light conversion unit
50E Light emitting panel
51E Stay
511 First mounting member
512 Second mounting member
52E Stay
53E Light conversion unit
54E Stay
50A Light emitting panel
57 Sealing material
B Back
DE Down
DL Light distribution
F Front
L Left
L10 Excitation reflected light
L11 Excitation outgoing light
R Right
U Up
Z Reference axis

The invention claimed is:

1. A vehicle lamp comprising:
a lamp housing and a lamp lens forming a lamp chamber; and
an excitation-light irradiation unit, a light conversion unit, and an optical filter disposed in the lamp chamber, wherein
the excitation-light irradiation unit emits excitation light to the light conversion unit,
the light conversion unit causes secondary light to be emitted by the excitation light emitted from the excitation-light irradiation unit and the secondary light to be emitted to a side of the lamp lens,
the optical filter transmits the excitation light and absorbs the secondary light, and
the light conversion unit is disposed at an angle larger than 0° with respect to a line normal to a main emission direction of the secondary light.

2. The vehicle lamp according to claim 1, wherein
the optical filter is disposed at a position between the excitation-light irradiation unit and the light conversion unit and out of an emission range of the secondary light.

3. The vehicle lamp according to claim 1, wherein
the light conversion unit is disposed at an angle larger than 0° with respect to the vertical.

4. The vehicle lamp according to claim 1, wherein
the lamp lens is a red lens;
the excitation light has a dominant wavelength shorter than 500 nm;
the secondary light has a dominant wavelength longer than 500 nm; and
the optical filter has:
transmittance of 50% or more for a part of the excitation light in a wavelength range of the excitation light from 200 nm to 500 nm; and transmittance of 50% or less for a part of the secondary light in a wavelength range of the secondary light from 500 nm to 800 nm.

5. A vehicle lamp comprising:

a lamp housing and a lamp lens forming a lamp chamber; and an excitation-light irradiation unit, a light conversion unit, and an optical filter disposed in the lamp chamber, wherein the excitation-light irradiation unit emits excitation light to the light conversion unit, the light conversion unit causes secondary light to be emitted by the excitation light emitted from the excitation-light irradiation unit and the secondary light to be emitted to a side of the lamp lens, the optical filter transmits the excitation light and absorbs the secondary light, and at least a surface of the lamp housing facing the lamp chamber is black in color.

6. The vehicle lamp according to claim 5, wherein the light conversion unit is disposed at an angle larger than 0° with respect to a line normal to a main emission direction of the secondary light.

7. The vehicle lamp according to claim 5, wherein the optical filter is disposed at a position between the excitation-light irradiation unit and the light conversion unit and out of an emission range of the secondary light.

8. The vehicle lamp according to claim 5, wherein the lamp lens is a red lens;

the excitation light has a dominant wavelength shorter than 500 nm;

the secondary light has a dominant wavelength longer than 500 nm; and the optical filter has:

transmittance of 50% or more for a part of the excitation light in a wavelength range of the excitation light from 200 nm to 500 nm; and transmittance of 50% or less for a part of the secondary light in a wavelength range of the secondary light from 500 nm to 800 nm.

9. A vehicle lamp comprising:

a lamp housing and a lamp lens forming a lamp chamber; and an excitation-light irradiation unit a light conversion unit, and an optical filter disposed in the lamp chamber, wherein the excitation-light irradiation unit emits excitation light to the light conversion unit, the light conversion unit causes secondary light to be emitted by the excitation light emitted from the excitation-light irradiation unit and the secondary light to be emitted to a side of the lamp lens, the optical filter transmits the excitation light and absorbs the secondary light, the excitation-light irradiation unit has:

an excitation light source that emits the excitation light; and an excitation-light final irradiation surface that finally irradiates the light conversion unit with the excitation light emitted from the excitation light source, the light conversion unit has:

a light emitting film that emits the secondary light by the excitation light emitted from the excitation-light final irradiation surface;

a reflection film that causes the secondary light emitted from the light emitting film to be reflected to a side of the light emitting film; and a secondary-light emitting surface that causes the secondary light to be emitted to a side of the lamp lens, the optical filter is disposed at a position between the excitation-light final irradiation surface of the excitation-light irradiation unit and the secondary-light emitting surface of the light conversion unit and out of the secondary-light emitting surface on a front view seen from a direction opposite to an emission direction of the secondary light.

10. The vehicle lamp according to claim 9, wherein the light conversion unit is disposed in a state where the secondary-light emitting surface is faced downward at an angle larger than 0° with respect to a normal line of the emission direction of the secondary light; and the optical filter and the excitation-light irradiation unit are disposed on a lower side with respect to the light conversion unit.

11. The vehicle lamp according to claim 9, wherein the light conversion unit is disposed in a state where the secondary-light emitting surface is faced downward at an angle larger than 0° with respect to the vertical; and the optical filter and excitation-light irradiation unit are disposed on a lower side with respect to the light conversion unit.

12. The vehicle lamp according to claim 9, wherein the light conversion unit is disposed at an angle larger than 0° with respect to a line normal to a main emission direction of the secondary light.

13. The vehicle lamp according to claim 9, wherein the optical filter is disposed at a position between the excitation-light irradiation unit and the light conversion unit and out of an emission range of the secondary light.

14. The vehicle lamp according to claim 9, wherein the lamp lens is a red lens;

the excitation light has a dominant wavelength shorter than 500 nm;

the secondary light has a dominant wavelength longer than 500 nm; and the optical filter has:

transmittance of 50% or more for a part of the excitation light in a wavelength range of the excitation light from 200 nm to 500 nm; and transmittance of 50% or less for a part of the secondary light in a wavelength range of the secondary light from 500 nm to 800 nm.

* * * * *